(12) United States Patent
Guruva reddiar et al.

(10) Patent No.: US 12,341,977 B2
(45) Date of Patent: Jun. 24, 2025

(54) TECHNOLOGIES FOR REGION-OF-INTEREST VIDEO ENCODING

(71) Applicant: Intel Corporation, Santa Clara, CA (US)

(72) Inventors: Palanivel Guruva reddiar, Chandler, AZ (US); Praveen P. Nair, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1034 days.

(21) Appl. No.: 17/132,714

(22) Filed: Dec. 23, 2020

(65) Prior Publication Data

US 2021/0152834 A1 May 20, 2021

(51) Int. Cl.
*H04N 19/167* (2014.01)
*H04N 19/136* (2014.01)
*H04N 19/172* (2014.01)

(52) U.S. Cl.
CPC ......... *H04N 19/167* (2014.11); *H04N 19/136* (2014.11); *H04N 19/172* (2014.11)

(58) Field of Classification Search
CPC .. H04N 19/167; H04N 19/136; H04N 19/172; H04N 19/119; H04N 19/147
See application file for complete search history.

(56) References Cited

U.S. PATENT DOCUMENTS

| 8,605,945 | B2 | 12/2013 | El-Maleh et al. | |
| 9,286,517 | B2 | 3/2016 | Deng et al. | |
| 2006/0215766 | A1* | 9/2006 | Wang | H04N 19/126 |
| | | | | 375/E7.172 |
| 2008/0152245 | A1* | 6/2008 | El-Maleh | H04N 19/44 |
| | | | | 375/E7.199 |
| 2016/0014333 | A1 | 1/2016 | Corcoran et al. | |
| 2019/0045203 | A1* | 2/2019 | Varadarajan | H04N 19/42 |
| 2022/0021887 | A1* | 1/2022 | Banerjee | H04N 19/115 |
| 2022/0165054 | A1* | 5/2022 | Olwal | H04N 23/61 |

OTHER PUBLICATIONS

Yang, et al. "A ROI Quality Adjustable Rate Control Scheme for Low Bitrate Video Coding." 2009 Picture Coding Symposium, May 6-8, 2009. (Year: 2009).*

* cited by examiner

*Primary Examiner* — Kyle M Lotfi
(74) *Attorney, Agent, or Firm* — Alliance IP, LLC

(57) ABSTRACT

Techniques for region-of-interest video encoding are disclosed. A compute node can determine a weighted average noise parameter for an encoded frame with a region of interest by weighting noise in the region of interest differently from noise outside the region of interest. Such a weighted average noise parameter can be used to encode subsequent frames of the video to improve the overall quality of the encoding. Other applications of the weighted average noise parameter are disclosed.

23 Claims, 16 Drawing Sheets

TECHNOLOGIES FOR REGION-OF-INTEREST VIDEO ENCODING

BACKGROUND

Video encoding requires a trade-off between the video quality and bit rate of an encoding. In some cases, an encoder will encode a frame and then calculate a noise parameter based on the differences between the encoded frame and the original frame. The noise parameter can then be used as feedback in tuning encoding parameters, such as the number of bits allocated to the next frame. However, such an approach may not encode areas of interest of the video with low distortion.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
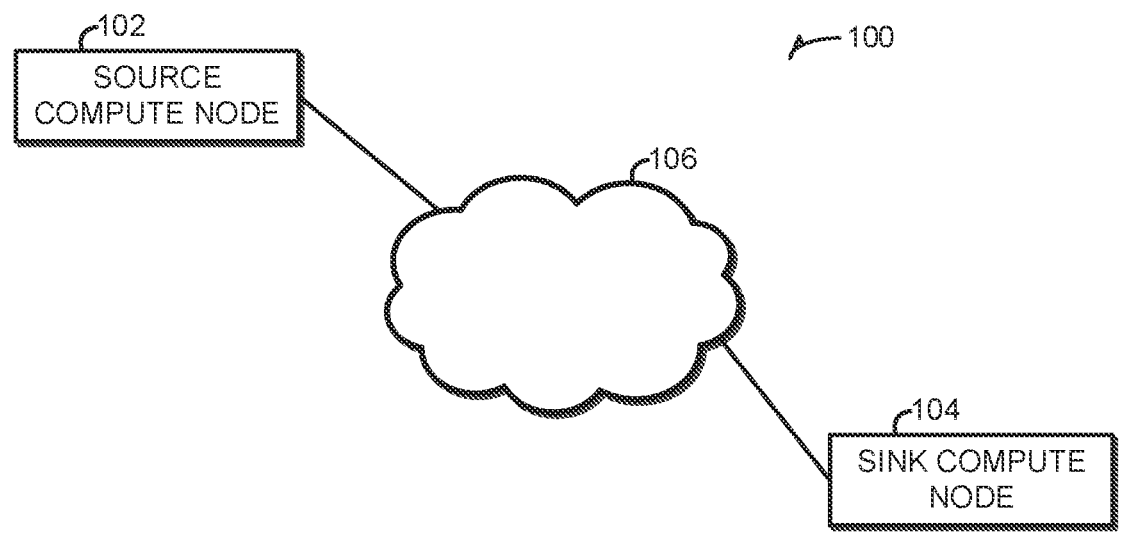
FIG. 1 is a simplified block diagram of at least one embodiment of a source compute node for encoding and sending video and a sink compute node for receiving and decoding video.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 includes a source compute node 102 and a sink compute nodes 104 connected by a network 106. In the illustrative embodiment, the source compute node 102 captures video made up of several frames. The source compute node 102 identifies a region of interest in each frame and encodes the frame based on the identified region of interest. After each frame is encoded, a weighted average noise parameter is determined based on a weighted average of the signal-to-noise ratio in the region of interest and the signal-to-noise ratio outside of the region of interest. The weighted average noise parameter can be used as a parameter to encode subsequent frames. The weighted average noise parameter may indicate the absolute noise level or may indicate a signal-to-noise ratio. The source compute node 102 sends the encoded frames to the sink compute node 104.

The illustrative sink compute node 104 is configured to automatically identify a region of interest in the encoded frames. The sink compute node 104 may then enhance the non-ROI areas of the image, such as by using a generative adversarial network.

Figure 2A:
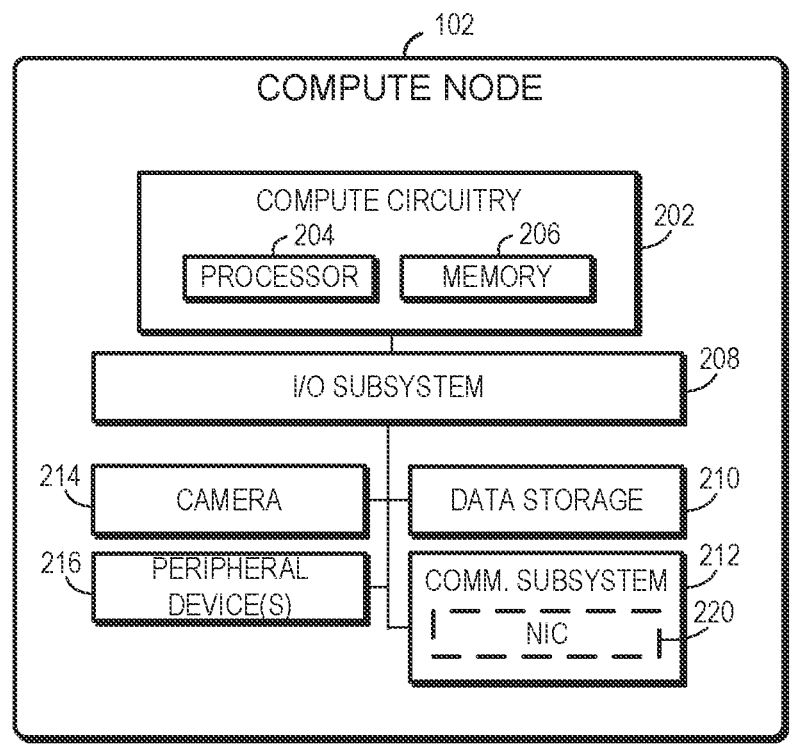
FIG. 2A is a simplified block diagram of at least one embodiment of a compute node of FIG. 1.
Figure 2B:
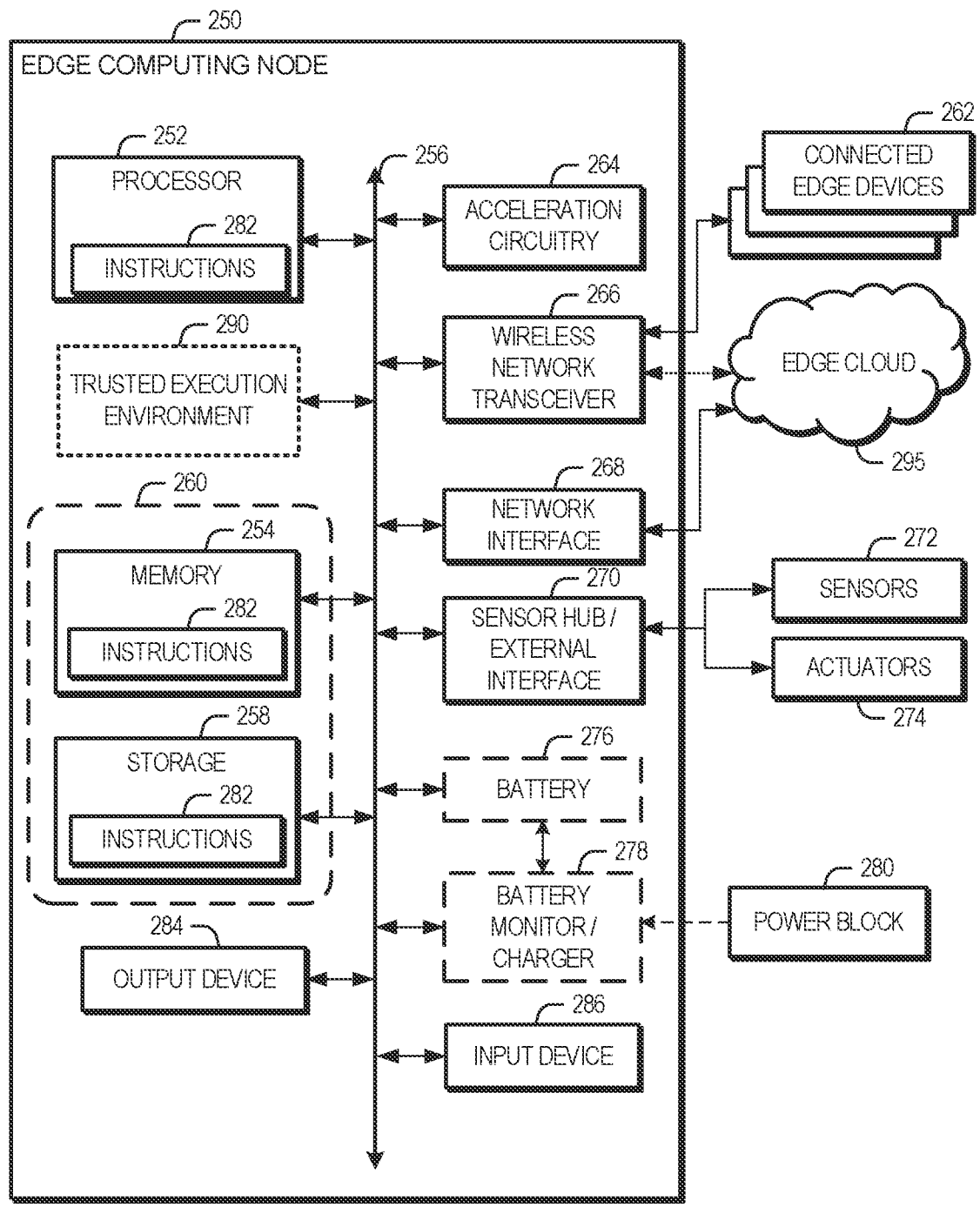
FIG. 2B provides a further overview of example components within a compute node of FIG. 1.

Each of the source compute node 102 and the sink compute node 104 may be embodied as any suitable compute node, such as the compute node 200 shown in FIG. 2A or the edge computing node 250 shown in FIG. 2B. The source compute node 102 and/or the sink compute node 104 may be embodied in or form a part of an edge computing system, a data center computing system, or any other suitable computing system. The network 106 connecting the source compute node 102 to the sink compute node 104 may be any suitable network or combination of networks. For example, the network 106 may be any combination of an internet, an intranet, an ethernet-based network, a TCP/IP network, an edge network, etc.

In further examples, any of the compute nodes (e.g., the sink compute node 102 and/or the sink compute node 104) or devices discussed with reference to the present edge computing systems and environment may be fulfilled based on the components depicted in FIGS. 2A and 2B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 2A, an edge compute node 200 includes a compute engine (also referred to herein as "compute circuitry") 202, an input/output (I/O) subsystem 208, data storage 210, a communication circuitry subsystem 212, and, optionally, a camera 214 and/or one or more peripheral devices 216. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 200 may be embodied as any type of engine, device, or collection of devices capable of performing various compute functions. In some examples, the compute node 200 may be embodied as a single device such as an integrated circuit, an embedded system, a field-programmable gate array (FPGA), a system-on-a-chip (SOC), or other integrated system or device. In the illustrative example, the compute node 200 includes or is embodied as a processor 204 and a memory 206. The processor 204 may be embodied as any type of processor capable of performing the functions described herein (e.g., executing an application). For example, the processor 204 may be embodied as a multi-core processor(s), a microcontroller, a processing unit, a specialized or special purpose processing unit, or other processor or processing/controlling circuit.

In some examples, the processor 204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 204 may work in coordination with each other to execute many types of operations and instructions within and on behalf of the compute node 200.

The memory 206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 206 may be integrated into the processor 204. The memory 206 may store various software and data used during operation such as one or more applications, data operated on by the application(s), libraries, and drivers.

The compute circuitry 202 is communicatively coupled to other components of the compute node 200 via the I/O subsystem 208, which may be embodied as circuitry and/or components to facilitate input/output operations with the compute circuitry 202 (e.g., with the processor 204 and/or the main memory 206) and other components of the compute circuitry 202. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 208 may form a portion of a system-on-a-chip (SoC) and be incorporated, along with one or more of the processor 204, the memory 206, and other components of the compute circuitry 202, into the compute circuitry 202.

The one or more illustrative data storage devices 210 may be embodied as any type of devices configured for short-term or long-term storage of data such as, for example, memory devices and circuits, memory cards, hard disk drives, solid-state drives, or other data storage devices. Individual data storage devices 210 may include a system partition that stores data and firmware code for the data storage device 210. Individual data storage devices 210 may also include one or more operating system partitions that store data files and executables for operating systems depending on, for example, the type of compute node 200.

In some embodiments, the data storage device 210 may include a processor 220, a memory 222, and an accelerator 224. The processor 220 and/or memory 222 may be similar to the processor 204 and/or the memory 206, a description of which will not be repeated in the interest of clarity. Of course, in some embodiments, the capacity, speed, bandwidth, etc., of the processor 220 and/or the memory 222 may be different from that of the processor 204 and/or the memory 206, respectively. The accelerator 224 may be embodied as any circuit or circuits that can accelerate certain compute tasks. For example, the accelerator 224 may be embodied as a field programmable gate array (FPGA), an application specific integrated circuit (ASIC), a neural network circuit, a graphics processing unit (GPU), a general purpose graphics processing unit (GPGPU), etc.

In the illustrative embodiment, the data storage device 210 and, if present, the processor 220, the memory 222, and the accelerator 224 are all enclosed in a storage device chassis or storage device enclosure that separates the storage device 210 from other components of the compute node 200, such as the compute circuitry 202.

The communication circuitry 212 may be embodied as any communication circuit, device, or collection thereof, capable of enabling communications over a network between the compute circuitry 202 and another compute device (e.g., an edge gateway of an implementing edge computing system). The communication circuitry 212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 212 includes a network interface controller (NIC) 226, which may also be referred to as a host fabric interface (HFI). The NIC 226 may be embodied as one or more add-in-boards, daughter cards, network interface cards, controller chips, chipsets, or other devices that may be used by the compute node 200 to connect with another compute device (e.g., an edge gateway node). In some examples, the NIC 226 may be embodied as part of a system-on-a-chip (SoC) that includes one or more processors, or included on a multichip package that also contains one or more processors. In some examples, the NIC 226 may include a local processor (not shown) and/or a local memory (not shown) that are both local to the NIC 226. In such examples, the local processor of the NIC 226 may be capable of performing one or more of the functions of the compute circuitry 202 described herein. Additionally, or alternatively, in such examples, the local memory of the NIC 226 may be integrated into one or more components of the client compute node at the board level, socket level, chip level, and/or other levels.

The illustrative camera 214 may be embodied as any suitable device capable of capturing a series of images. In the illustrative embodiment, the camera 214 has a lens focusing light onto an image sensor. In other embodiments, different imaging elements may be used, such as apertures, mirrors, filters, etc. The image sensor may be based on any suitable sensor, such as complementary metal-oxide semiconductor (CMOS) sensors, charged coupled device (CCD) sensors, thermal sensors, etc. The camera 214 may have any suitable resolution, such as 640×480, 768×1024, 1024×1280, 1080×1920, 2160×3840, 4320×7680, etc. The camera 214 may capture video at any suitable frame rate, such as 24 frames per second (FPS), 30 FPS, 60 FPS, 120, FPS, 240 FPS, etc. The camera 214 may be sensitive to any suitable color range, such as millimeter wave, infrared, visible, ultraviolet, x-ray, etc. The camera 214 may be black and white or may have two or more channels, such as red, green, and blue channels.

Additionally, in some examples, a respective compute node 102 may include one or more peripheral devices 216. Such peripheral devices 216 may include any type of peripheral device found in a compute device or server such as audio input devices, a display, other input/output devices, interface devices, and/or other peripheral devices, depending on the particular type of the compute node 200. In further examples, the compute node 200 may be embodied by a respective edge compute node (whether a client, gateway, or aggregation node) in an edge computing system or like forms of appliances, computers, subsystems, circuitry, or other components.

Additionally, in some examples, a respective compute node 200 may include one or more peripheral devices 214. Such peripheral devices 214 may include any type of peripheral device found in a compute device or server such as audio input devices, a display, other input/output devices, interface devices, and/or other peripheral devices, depending on the particular type of the compute node 200. In further examples, the compute node 200 may be embodied by a respective edge compute node (whether a client, gateway, or aggregation node) in an edge computing system or like forms of appliances, computers, subsystems, circuitry, or other components.

It should be appreciated that, in some embodiments, the particular hardware for the source compute node 102 may be different from that of the sink compute node 104. For example, in some embodiments, the source compute node 102 may include relatively powerful compute circuitry 202 while the sink compute node 104 may include less powerful compute circuitry 202. At the same time, the sink compute node 104 may include data storage 210 that has more storage or more capability than data storage 210 in the source compute node 102 (or the source compute node 102 may not include a data storage 210). In one example, the source compute node 102 has a camera 214 and the sink compute node 104 does not have a camera 214.

In a more detailed example, FIG. 2B illustrates a block diagram of an example of components that may be present in an edge computing node 250 for implementing the techniques (e.g., operations, processes, methods, and methodologies) described herein. This edge computing node 250 provides a closer view of the respective components of node 200 when implemented as or as part of a computing device (e.g., as a mobile device, a base station, server, gateway, etc.). The edge computing node 250 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 250, or as components otherwise incorporated within a chassis of a larger system.

The edge computing device 250 may include processing circuitry in the form of a processor 252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 252 may be a part of a system on a chip (SoC) in which the processor 252 and other components are formed into a single integrated circuit, or a single package, such as the Edison™ or Galileo™ SoC boards from Intel Corporation, Santa Clara, California As an example, the processor 252 may include an Intel® Architecture Core™ based CPU processor, such as a Quark™, an Atom™ an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 252 and accompanying circuitry may be provided in a single socket form factor, multiple socket form factor, or a variety of other formats, including in limited hardware configurations or configurations that include fewer than all elements shown in FIG. 2B.

The processor 252 may communicate with a system memory 254 over an interconnect 256 (e.g., a bus). Any number of memory devices may be used to provide for a given amount of system memory. As examples, the memory 254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 258 may also couple to the processor 252 via the interconnect 256. In an example, the storage 258 may be implemented via a solid-state disk drive (SSDD). Other devices that may be used for the storage 258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 258 may be on-die memory or registers associated with the processor 252. However, in some examples, the storage 258 may be implemented using a micro hard disk drive (HDD). Further, any number of new technologies may be used for the storage 258 in addition to, or instead of, the technologies described, such resistance change memories, phase change memories, holographic memories, or chemical memories, among others.

The components may communicate over the interconnect 256. The interconnect 256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 256 may couple the processor 252 to a transceiver 266, for communications with the connected edge devices 262. The transceiver 266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 266 (or multiple transceivers) may communicate using multiple standards or radios for communications at a different range. For example, the edge computing node 250 may communicate with close devices, e.g., within about 10 meters, using a local transceiver based on Bluetooth Low Energy (BLE), or another low power radio, to save power. More distant connected edge devices 262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 266 (e.g., a radio transceiver) may be included to communicate with devices or services in a cloud (e.g., an edge cloud 295) via local or wide area network protocols. The wireless network transceiver 266 may be a low-power wide-area (LPWA) transceiver that follows the IEEE 802.15.4, or IEEE 802.15.4g standards, among others. The edge computing node 250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 266, as described herein. For example, the transceiver 266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 268 may be included to provide a wired communication to nodes of the edge cloud 295 or to other devices, such as the connected edge devices 262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 268 may be included to enable connecting to a second network, for example, a first NIC 268 providing communications to the cloud over Ethernet, and a second NIC 268 providing communications to other devices over another type of network.

Given the variety of types of applicable communications from the device to another component or network, applicable communications circuitry used by the device may include or be embodied by any one or more of components 264, 266, 268, or 270. Accordingly, in various examples, applicable means for communicating (e.g., receiving, transmitting, etc.) may be embodied by such communications circuitry.

The edge computing node 250 may include or be coupled to acceleration circuitry 264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 256 may couple the processor 252 to a sensor hub or external interface 270 that is used to connect additional devices or subsystems. The devices may include sensors 272, such as accelerometers, level sensors, flow sensors, optical light sensors, camera sensors, temperature sensors, global navigation system (e.g., GPS) sensors, pressure sensors, barometric pressure sensors, and the like. The hub or interface 270 further may be used to connect the edge computing node 250 to actuators 274, such as power switches, valve actuators, an audible sound generator, a visual warning device, and the like.

In some optional examples, various input/output (I/O) devices may be present within or connected to, the edge computing node 250. For example, a display or other output device 284 may be included to show information, such as sensor readings or actuator position. An input device 286, such as a touch screen or keypad may be included to accept input. An output device 284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 276 may power the edge computing node 250, although, in examples in which the edge computing node 250 is mounted in a fixed location, it may have a power supply coupled to an electrical grid, or the battery may be used as a backup or for temporary capabilities. The battery 276 may be a lithium ion battery, or a metal-air battery, such as a zinc-air battery, an aluminum-air battery, a lithium-air battery, and the like.

A battery monitor/charger 278 may be included in the edge computing node 250 to track the state of charge (SoCh) of the battery 276, if included. The battery monitor/charger 278 may be used to monitor other parameters of the battery 276 to provide failure predictions, such as the state of health (SoH) and the state of function (SoF) of the battery 276. The battery monitor/charger 278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 278 may communicate the information on the battery 276 to the processor 252 over the interconnect 256. The battery monitor/charger 278 may also include an analog-to-digital (ADC) converter that enables the processor 252 to directly monitor the voltage of the battery 276 or the current flow from the battery 276. The battery parameters may be used to determine actions that the edge computing node 250 may perform, such as transmission frequency, mesh network operation, sensing frequency, and the like.

A power block 280, or other power supply coupled to a grid, may be coupled with the battery monitor/charger 278 to charge the battery 276. In some examples, the power block 280 may be replaced with a wireless power receiver to obtain the power wirelessly, for example, through a loop antenna in the edge computing node 250. A wireless battery charging circuit, such as an LTC4020 chip from Linear Technologies of Milpitas, California, among others, may be included in the battery monitor/charger 278. The specific charging circuits may be selected based on the size of the battery 276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 258 may include instructions 282 in the form of software, firmware, or hardware commands to implement the techniques described herein. Although such instructions 282 are shown as code blocks included in the memory 254 and the storage 258, it may be understood that any of the code blocks may be replaced with hardwired circuits, for example, built into an application specific integrated circuit (ASIC).

In an example, the instructions 282 provided via the memory 254, the storage 258, or the processor 252 may be embodied as a non-transitory, machine-readable medium 260 including code to direct the processor 252 to perform electronic operations in the edge computing node 250. The processor 252 may access the non-transitory, machine-readable medium 260 over the interconnect 256. For instance, the non-transitory, machine-readable medium 260 may be embodied by devices described for the storage 258 or may include specific storage units such as optical disks, flash drives, or any number of other hardware devices. The non-transitory, machine-readable medium 260 may include instructions to direct the processor 252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 282 on the processor 252 (separately, or in combination with the instructions 282 of the machine readable medium 260) may configure execution or operation of a trusted execution environment (TEE) 290. In an example, the TEE 290 operates as a protected area accessible to the processor 252 for secure execution of instructions and secure access to data. Various implementations of the TEE 290, and an accompanying secure area in the processor 252 or the memory 254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 250 through the TEE 290 and the processor 252.

Figure 3:
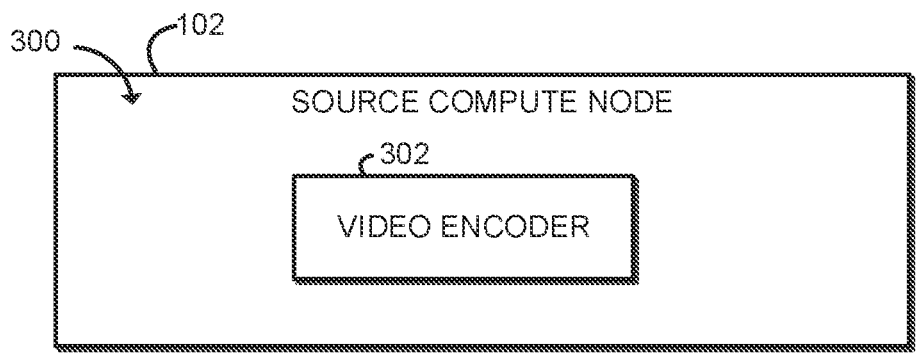
FIG. 3 is a simplified block diagram of at least one embodiment of an environment that may be established by a source compute node of FIG. 1.

Referring now to FIG. 3, in an illustrative embodiment, the source compute node 102 establishes an environment 300 during operation. The illustrative environment 300 includes a video encoder 302. The various modules of the environment 300 may be embodied as hardware, software, firmware, or a combination thereof. For example, the various modules, logic, and other components of the environment 300 may form a portion of, or otherwise be established by, the processor 204 or other hardware components of the source compute node 102 such as the memory 206, the data storage 210, etc. As such, in some embodiments, one or more of the modules of the environment 300 may be embodied as circuitry or collection of electrical devices (e.g., video encoder circuitry 312, etc.). In some embodiments, some or all of the modules of the environment 300 may be embodied as, e.g., a field programmable gate array (FPGA), an application specific integrated circuit (ASIC), an accelerator device, and/or the like. It should be appreciated that, in some embodiments, one or more of the circuits (e.g., the video encoder circuitry 312, etc.) may form a portion of one or more of the processor 204, the memory 206, the I/O subsystem 208, the data storage 210, and/or other components of the source compute node 102. For example, in some embodiments, some or all of the modules may be embodied as the processor 204 as well as the memory 206 and/or data storage 210 storing instructions to be executed by the processor 204. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 204 or other components of the source compute node 102. It should be appreciated that some of the functionality of one or more of the modules of the environment 300 may require a hardware implementation, in which case embodiments of modules which implement such functionality will be embodied at least partially as hardware.

The video encoder 302, which may be embodied as hardware, firmware, software, virtualized hardware, emulated architecture, and/or a combination thereof as discussed above, is configured to encode video received from a video source, such as the camera 214. In some embodiments, the video encoder 302 may access video stored on the source compute node 102 (such as stored in the data storage 21) or may receive video from a remote compute node, such as from the communication subsystem 212.

The illustrative video encoder 302 is configured to automatically determine a region of interest of frames of the video. The video encoder 302 may receive parameters or instructions for how to determine a region of interest. For example, the video encoder 302 may receive instructions to label a person as a region of interest, label a car as a region of interest, label a part of a car such as a license plate as a region of interest, etc. The video encoder 302 may apply machine-learning-based algorithms in order to identify the regions of interest. The video encoder 302 may access parameters for such an algorithm stored on the source compute node 102, may receive them from a user of the source compute node 102, may receive them from another compute node 102, may generate them using a machine learning training algorithm, etc.

For each frame of the video, the video encoder 302 may determine a region of interest of the frame. The video encoder 302 may indicate the region of interest in any suitable manner, such as by selecting macroblocks as including the region of interest, indicating a bounding box around the region of interest, indicating a contour around the region of interest, etc.

The video encoder 302 is configured to encode frames of the video. The video encoder 302 may use any suitable encoding algorithm to do so, such as an algorithm employing motion-compensated discrete cosine transforms. The video encoder 302 may encode the areas of the frame labeled as a region of interest in higher quality. As discussed in more detail below, a noise parameter of the previous frame's encoding may be used as a parameter for encoding the current frame.

The video encoder 302 is configured to determine a weighted average signal-to-noise ratio for each frame after encoding. The weighted average signal-to-noise ratio is based on a calculated signal-to-noise ratio of the area of the frame designated a region of interest and the calculated signal-to-noise ratio of the area of the frame not designated a region of interest, with the two different calculated signal-to-noise ratio values weighted differently. As used herein, noise refers to differences in an encoded frame from the original frame, and the signal-to-noise ratio refers to the ratio of the maximum signal (i.e., the highest intensity of a pixel) to the noise. In the illustrative embodiment, the noise of each pixel in the ROI area is weighted a different amount from each pixel in the non-ROI area. In other embodiments, the weighted average signal-to-noise ratio may factor in, e.g., the relative size of the ROI area vs. the non-ROI area, the shape of the ROI, area, etc. The parameter or parameters used in weight may depend on any suitable factors, such as a user setting, a parameter determined based on a machine-learning-based algorithm, etc.

In one embodiment, the video encoder 302 may calculate a weighted average peak signal-to-noise ratio. In the illustrative embodiment, the weighted average peak signal-to-noise ratio (WAPS) is defined as:

$$WAPS = 10\log\frac{MAX_I^2}{MSE},$$

or, equivalently, $$WAPS = 20\log MAX_I - 10\log MSE,$$

where $$MAX_I = 2^B - 1, \text{ and}$$

$$MSE = \frac{1}{mn}\sum_{i=0}^{m-1}\sum_{j=0}^{n-1} ROI(i, j) \times (I(i, j) - K(i, j))^2.$$

B is the bit depth, m is the length of the frame, n is the height of the frame, ROI(i, j) returns a if the pixel at coordinates (i, j) is in a region of interest and returns b otherwise, a is the weighting factor for ROI pixels, b is the weighting factor for non-ROI pixels, I(i, j) is the intensity of the pixel of the encoded frame with coordinate (i, j), and K(i, j) is the intensity of the pixel of the original frame with coordinate (i, j). The ROI(i, j) ensures that the noise of the ROI pixels is weighted differently from the noise of the non-ROI pixels. The illustrative bit depth is 8 bits. In other embodiments, it may be higher or lower, such as 6 to 20 bits. The length and height of the frame may be any suitable values, such as any resolution of the camera 214 listed above. The intensity I and K may be any value from 0 up to the maximum of the bit depth (i.e., $2^B-1$). The ratio between a and b may be any suitable ratio, such as anywhere from 1 to 1,000. It should be appreciated that only the relative values of a and b matter, as scaling both would simply scale the value of all similar WAPS measurements. In the illustrative embodiment, one of a or b may be fixed at 1. For example, b may be fixed at 1 and a may be any suitable value above 1.

It should be appreciated that the frame may have multiple channels, such as multiple color channels. The WAPS may be calculated for multiple channels in any suitable manner. For example, the WAPS may be calculated for each channel separately and summed together. The total intensity for all channels may be added together to make one channel, whose WAPS is calculated. The channels may be converted from one color space to another, such as from RGB to YCbCr or HSL, prior to determining the WAPS for each channel.

In another embodiment, the video encoder 302 may perform a weighted average structural similarity index measure (WASS). The WASS may be determined by calculating the structural similarity index measure (SSIM) for various windows, such as one SSIM for the ROI region and another SSIM for the non-ROI region. The SSIM for ROI region can be weighted, such as weighted by the factor a described above for the WAPS, and then added to the SSIM for the non-ROI region, which may be also weighted, such as by the factor b described above. The result of the sum of the two weighted SSIM values may be the WASS.

The video encoder 302 may encode a subsequent frame based on the weighted average signal-to-noise ratio of a previous frame. In the illustrative embodiment, the video encoder 302 uses the weighted average signal-to-noise ratio of the immediately preceding frame as a parameter for encoding the current frame. In some embodiments, frames such as reference frames or frames immediately after reference frames may not use the weighted average of any other frame as a parameter for encoding the frame. The weighted average signal-to-noise ratio of the previous frame, such as the WAPS or the WASS, may be used as a parameter to tune parameters of encoding the current frame, such as the parameters indicating a number of bits to use for the areas of the frame marked as a region of interest and for areas of the frame not marked as a region of interest. In this manner, the signal-to-noise ratio of both the ROI region and the non-ROI region can be used as a parameter in determining choices in a rate-distortion optimization procedure.

Figure 4:
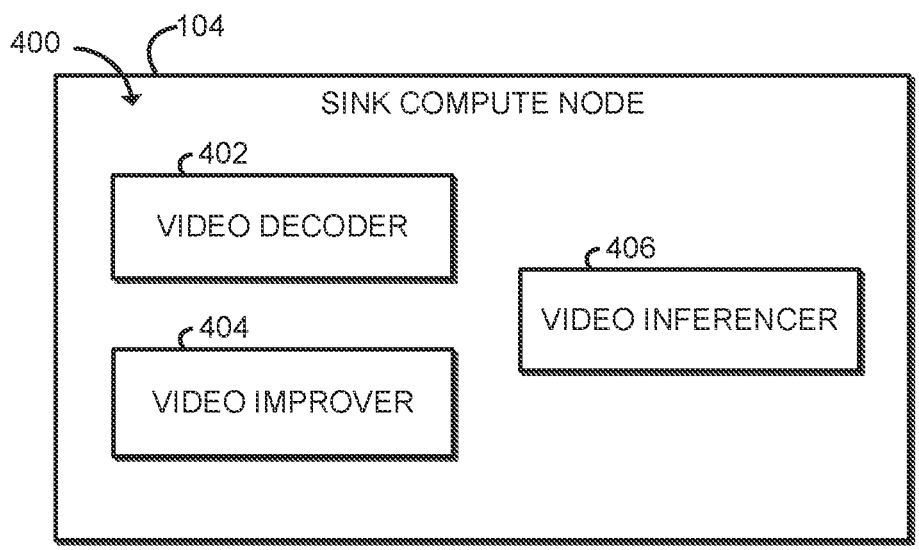
FIG. 4 is a simplified block diagram of at least one embodiment of an environment that may be established by a sink compute node of FIG. 1.

Referring now to FIG. 4, in an illustrative embodiment, the sink compute node 104 establishes an environment 400 during operation. The illustrative environment 400 includes a video decoder 402, a video improver 404, and a video inferencer 406. The various modules of the environment 400 may be embodied as hardware, software, firmware, or a combination thereof. For example, the various modules, logic, and other components of the environment 400 may form a portion of, or otherwise be established by, the processor 204 or other hardware components of the sink compute node 104 such as the memory 206, the data storage 210, etc. As such, in some embodiments, one or more of the modules of the environment 400 may be embodied as circuitry or collection of electrical devices (e.g., video decoder circuitry 402, video improver circuitry 404, video inference circuitry 406, etc.). In some embodiments, some or all of the modules of the environment 400 may be embodied as, e.g., a field programmable gate array (FPGA), an application specific integrated circuit (ASIC), an accelerator device, and/or the like. It should be appreciated that, in some embodiments, one or more of the circuits (e.g., the object manager circuitry 402, the query manager circuitry 404, and the data storage controller circuitry 406, etc.) may form a portion of one or more of the processor 204, the memory 206, the I/O subsystem 208, the data storage 210, and/or other components of the sink compute node 104. For example, in some embodiments, some or all of the modules may be embodied as the processor 204 as well as the memory 206 and/or data storage 210 storing instructions to be executed by the processor 204. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor 204 or other components of the sink compute node 104. It should be appreciated that some of the functionality of one or more of the modules of the environment 400 may require a hardware implementation, in which case embodiments of modules which implement such functionality will be embodied at least partially as hardware.

The video decoder 402, which may be embodied as hardware, firmware, software, virtualized hardware, emulated architecture, and/or a combination thereof as discussed above, is configured to decode frames of a video. The frames to decode may be received from, e.g., the source compute node 102 the captured the video. In other embodiments, the video decoder 402 may receive a frame by accessing it from a local storage device, receiving it from a local sensor, or receiving it from a remote compute device other than the one that captured the frame. The video decoder 402 may use a decoding algorithm corresponding to the encoding algorithm used to encode the video.

The video improver 404, which may be embodied as hardware, firmware, software, virtualized hardware, emulated architecture, and/or a combination thereof as discussed above, is configured to improve the decoded frame. It should be appreciated that, while the region of interest may be of high quality for both machine inferencing and human consumption, the area not marked as a region of interest may be of relatively low quality, particularly as perceived by a human viewer. As such, video improver 404 may improve the quality of the non-region of interest, such as by using a generative adversarial network or other machine-learning-based algorithm. While such an approach cannot, of course, remove the noise to return the encoded frame to the original frame, it can improve the perceived quality of the video for human consumption. Additionally, the video improver 404 can improve the machine vision accuracy at the expense of additional computation resources.

The video improver 404 may improve the quality of the non-ROI part of the frame based on a weighted average signal-to-noise ratio, such as the weighted average signal-to-noise ratio of the encoded frame or the weighted average signal-to-noise ratio of the frame used to encode the current frame. The video improver 404 may calculate the weighted average signal-to-noise ratio between the encoded frame and the frame after the quality is improved by, e.g., the generative adversarial network. The generative adversarial network (or other quality improvement algorithm) may tune the amount of improvement until the calculated weighted average signal-to-noise ratio of the improved frame relative to the encoded frame matches or is within a predetermined threshold difference of a weighted average signal-to-noise ratio value received with the encoded frames.

The video inferencer 406, which may be embodied as hardware, firmware, software, virtualized hardware, emulated architecture, and/or a combination thereof as discussed above, is configured to perform inferencing on the received frames. The video inferencer 406 may perform inferencing on the frames before or after quality improvement by the video improver 404. It should be appreciated that, in the illustrative embodiment, the areas of the frame designated as a region of interest are not improved by the video improver 404 and that it is the areas designated as a region of interest that the video inferencer 406 focuses on. As a result, the video improver 404 does not interfere with the performance of the video inferencer 406.

Figure 5:
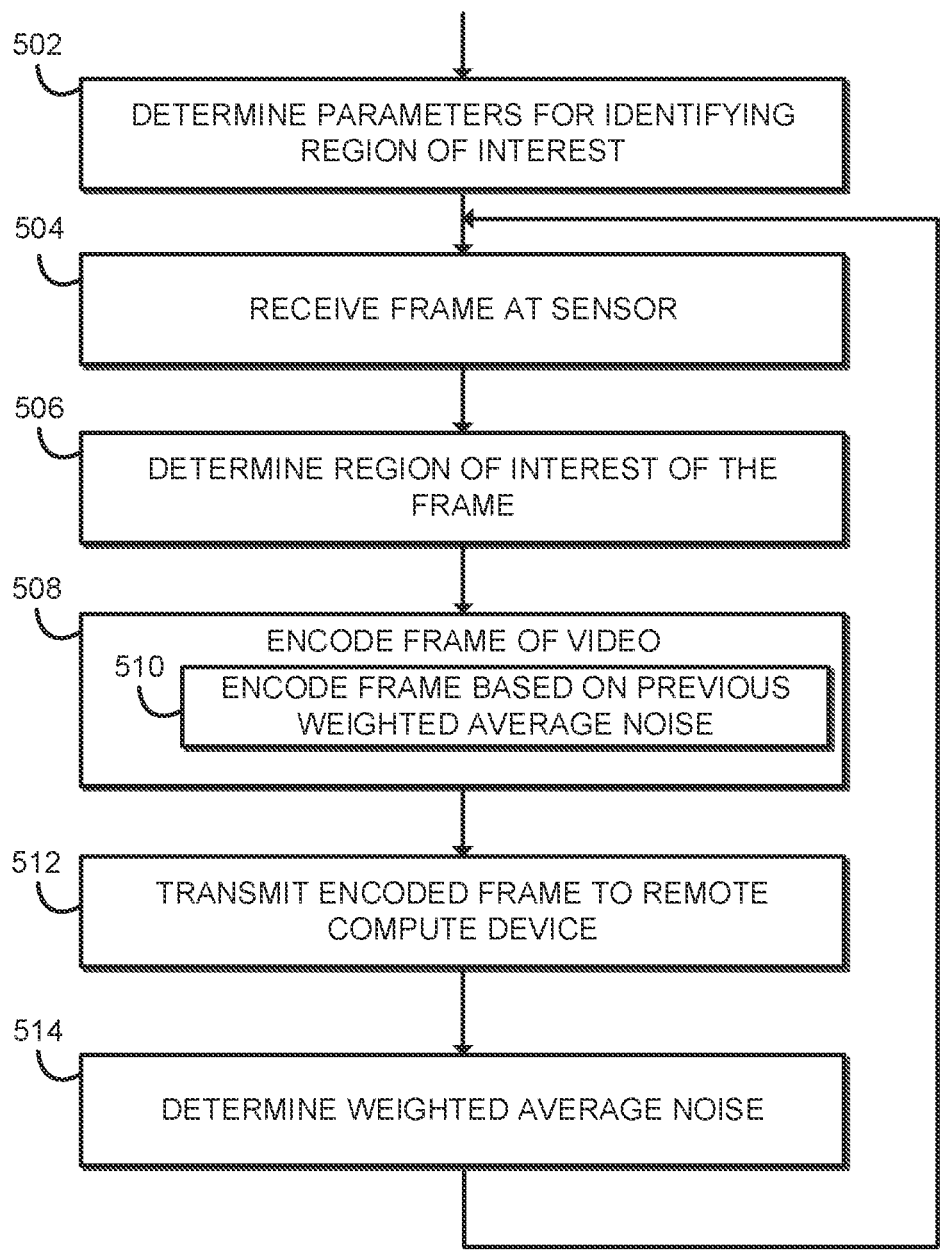
FIG. 5 is a simplified flow diagram of at least one embodiment of a method for encoding video that may be executed by a source compute node of FIG. 1.

Referring now to FIG. 5, in use, a source compute node 102 may execute a method 500 for encoding a video. The method 500 begins in block 502, in which the source compute node 102 determines parameters for identifying a region of interest. The region of interest may be, e.g., a region with a person in it, a region with a car in it, a region with a license plate of a car in it, etc. The parameters used to determine the region of interest may be any suitable parameters, such as parameters of a machine-learning-based image processing algorithm. The source compute node 102 may determine the parameters in any suitable manner. For example, the source compute node 102 may access parameters for such an algorithm stored on the source compute node 102, may receive them from a user of the source compute node 102, may receive them from another compute node 102, may generate them using a machine learning training algorithm, etc.

In block 504, the source compute node 102 receives a frame at a sensor, such as the camera 214. In some embodiments, the source compute node 102 may receive a frame by, e.g., accessing it from data storage 210 on the source compute node 102, receive it from another compute node, etc.

In block 506, the source compute node 102 determines a region of interest of the frame with use of the determined parameters for identifying a region of interest. The source compute node 102 may indicate the region of interest in any suitable manner, such as by selecting macroblocks as including the region of interest, indicating a bounding box around the region of interest, indicating a contour around the region of interest, etc.

In block 508, the source compute node 102 encodes a frame of the video. The source compute node 102 may use any suitable encoding algorithm to do so, such as an algorithm employing motion-compensated discrete cosine transforms. The source compute node 102 may encode the areas of the frame labeled as a region of interest in higher quality. It should be appreciated that, in some embodiments, certain frames may not be encoded, such as reference frames.

The source compute node 102 may encode the frame based on the weighted average signal-to-noise ratio of the previous frame in block 510. The weighted average signal-to-noise ratio of the previous frame is discussed in more detail above in regard to the video encoder 302 and in more detail below in regard to block 514. The weighted average signal-to-noise ratio of the previous frame, such as the WAPS or the WASS, may be used as a parameter to tune parameters of encoding the current frame, such as the parameters indicating a number of bits to use for the areas of the frame marked as a region of interest and for areas of the frame not marked as a region of interest.

In block 512, in the illustrative embodiment, the source compute node 102 sends the encoded frame to the remote compute device, such as a sink compute node 104. Additionally or alternatively, in some embodiments, the source compute node 102 may store the encoded frame locally on the source compute node 102 for later processing or transmission.

In block 514, the source compute node 102 determines a weighted average signal-to-noise ratio of the encoded frame. Noise refers to differences in an encoded frame from the original frame, and the weighted average signal-to-noise ratio is based on a calculated signal-to-noise ratio of the area of the frame designated a region of interest and the calculated signal-to-noise ratio of the area of the frame not designated a region of interest, with the two different calculated noise values weighted differently. The source compute node 102 may calculate any suitable weighted average signal-to-noise ratio, such as the WAPS or the WASS discussed above in regard to the video encoder 402. As discussed above, the weighted average signal-to-noise ratio can be used as an input in determining parameters for encoding the next frame. The method 500 then loops back to block 504, to receive the next frame at the sensor.

Figure 6:
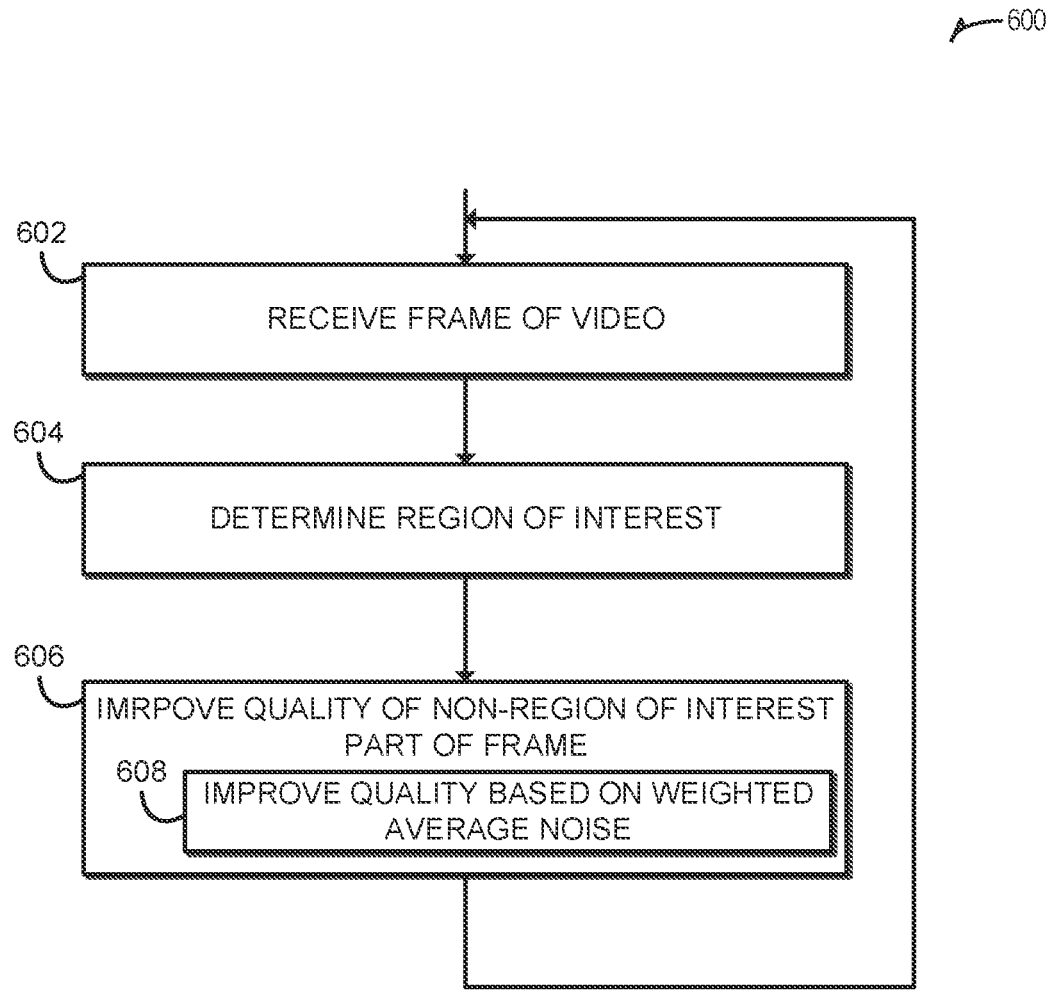
FIG. 6 is a simplified flow diagram of at least one embodiment of a method for decoding video that may be executed by a sink compute node of FIG. 1.

Referring now to FIG. 6, in use, a sink compute node 104 may execute a method 600 for decoding a video. The method 600 begins in block 602, in which the sink compute node 104 receives a frame of video. In the illustrative embodiment, the sink compute node 104 receives the frame from the source compute node 102 the captured the video. In other embodiments, the sink compute node 104 may receive a frame by accessing it from a local storage device, receiving it from a local sensor, or receiving it from a remote compute device other than the one that captured the frame. In the illustrative embodiment, the sink compute node 104 also receives an indication of the weighted average signal-to-noise ratio of the current and/or previous frame.

In block 604, the sink compute node 104 determines a region of interest. In the illustrative embodiment, the sink compute node 104 applies a machine-learning-based algorithm to identify areas that have been encoded as regions of interest. The machine-learning-based algorithm may be trained using labeled or unlabeled training data of frames with areas encoded as regions of interest and areas encoded as non-regions of interest. The training data may be generated with use of, e.g., the video encoder 402. In some embodiments, the training data may be generated with use of a video encoder that does not employ weighted average signal-to-noise ratio of the previous frame to encode the current frame.

In block 606, the sink compute device 104 improves the quality of the non-region of interest part of the frame. It should be appreciated that, while the region of interest may be of high quality for both machine inferencing and human consumption, the area not marked as a region of interest may be of relatively low quality. As such, the sink compute device 104 may improve the quality of the non-region of interest, such as by using a generative adversarial network or other machine-learning-based algorithm. While such an approach cannot, of course, remove the noise to return the encoded frame to the original frame, it can improve the perceived quality of the video for human consumption.

In block 608, the sink compute device 104 improves the quality of the non-ROI part of the frame based on a weighted average signal-to-noise ratio, such as the weighted average signal-to-noise ratio of the encoded frame or the weighted average signal-to-noise ratio of the frame used to encode the current frame. The sink compute device 104 may calculate the weighted average signal-to-noise ratio between the encoded frame and the frame after the quality is improved by, e.g., the generative adversarial network. The generative adversarial network (or other quality improvement algorithm) may tune the amount of improvement until the calculated weighted average signal-to-noise ratio of the improved frame relative to the encoded frame matches or is within a predetermined threshold difference of the weighted average signal-to-noise ratio value received in block 602.

After the frame is improved, it may be passed to another component, such as a display to be displayed to a user or a video inferencer 406 for an inferencer to process the frame. The method 600 then loops back to block 602 to receive the next frame of the video.

Example Computing Embodiments

The following sections present various examples of computing devices, systems, architectures, and environments that may be used in conjunction with the DFS storage and query processing functionality described throughout this disclosure.

Example Edge Computing Embodiments

Figure 7:
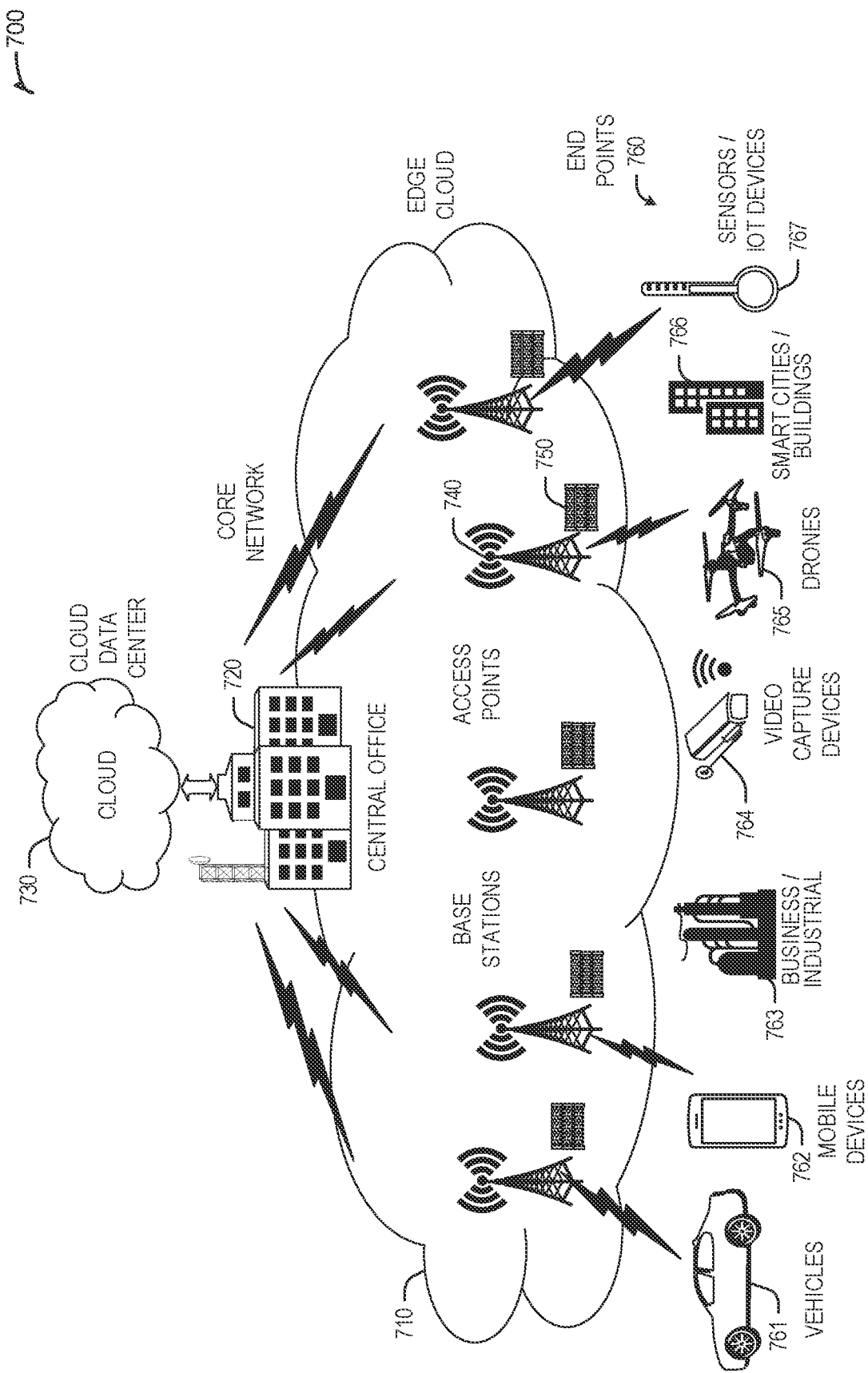
FIG. 7 illustrates an overview of an edge cloud configuration for edge computing.

FIG. 7 is a block diagram 700 showing an overview of a configuration for edge computing, which includes a layer of processing referred to in many of the following examples as an "edge cloud". As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
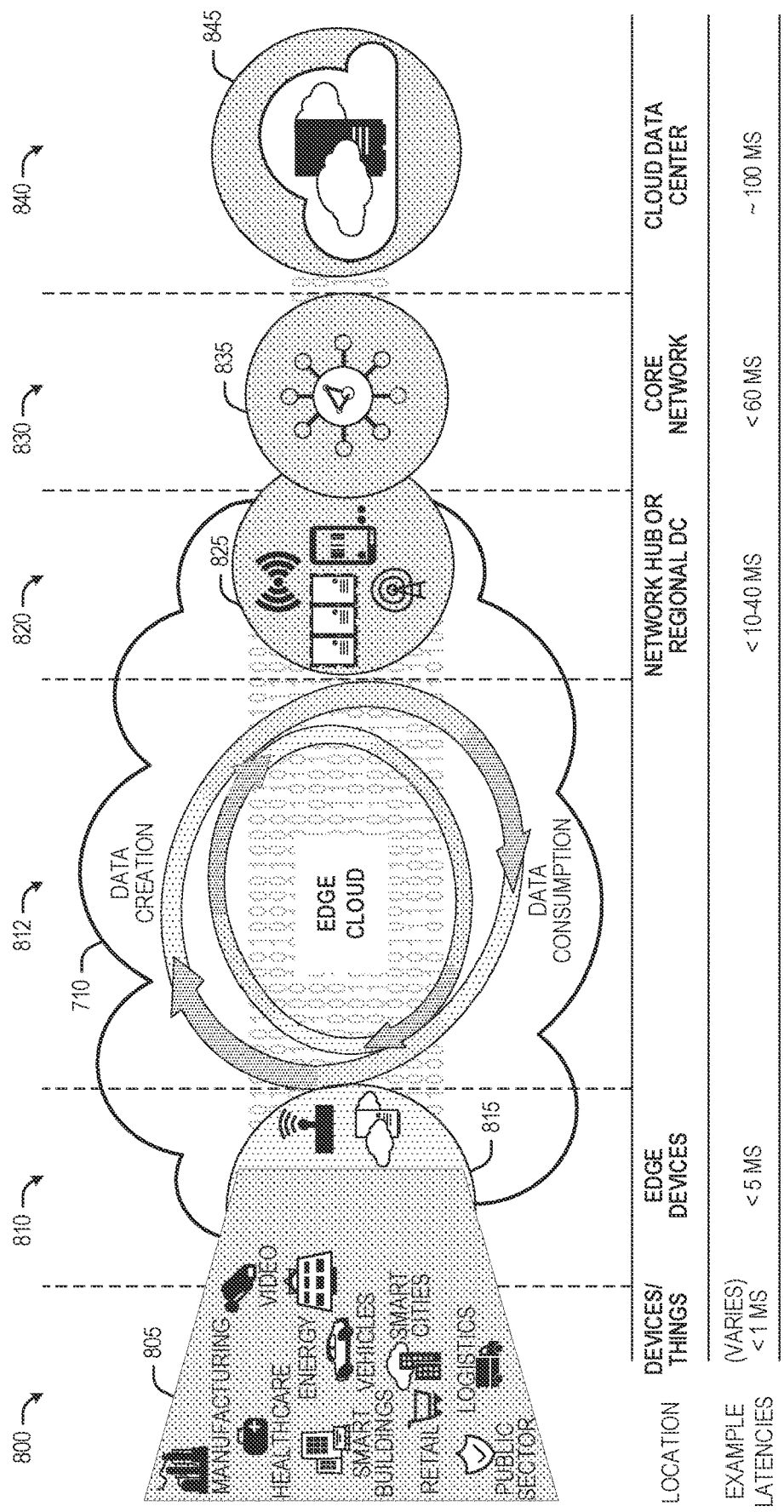
FIG. 8 illustrates operational layers among endpoints, an edge cloud, and cloud computing environments.

FIG. 8 illustrates operational layers among endpoints, an edge cloud, and cloud computing environments. Specifically, FIG. 8 depicts examples of computational use cases 805, utilizing the edge cloud 710 among multiple illustrative layers of network computing. The layers begin at an endpoint (devices and things) layer 800, which accesses the edge cloud 710 to conduct data creation, analysis, and data consumption activities. The edge cloud 710 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. Beyond the edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close", "local", "near", "middle", or "far" edge may be based on latency, distance, number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 710 (network layers 800-840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 710.

As such, the edge cloud 710 is formed from network components and functional features operated by and within edge gateway nodes, edge aggregation nodes, or other edge compute nodes among network layers 810-830. The edge cloud 710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 710 may be servers, multi-tenant servers, appliance computing devices, and/or any other type of computing devices. For example, the edge cloud 710 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 2B. The edge cloud 710 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 9:
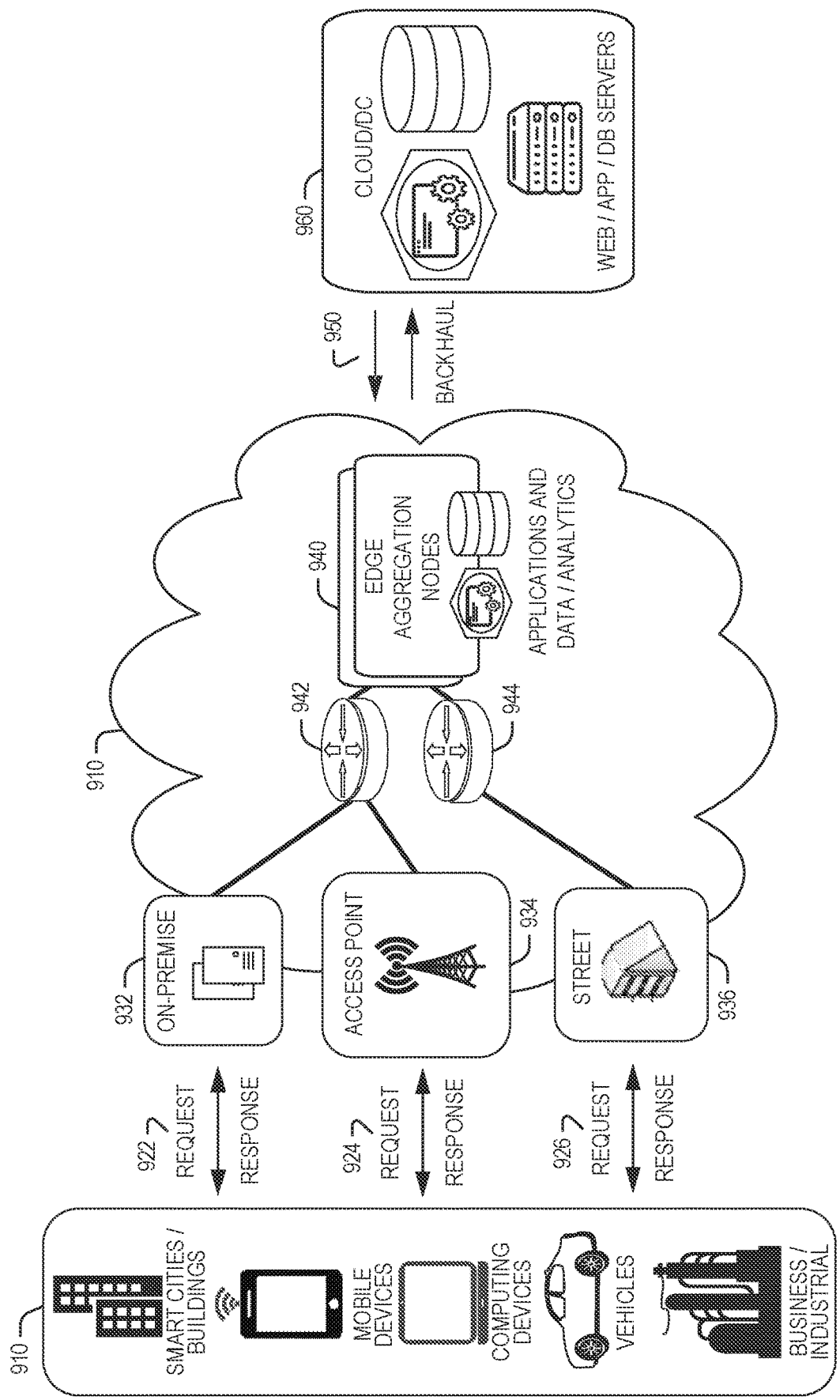
FIG. 9 illustrates an example approach for networking and services in an edge computing system.

In FIG. 9, various client endpoints 910 (in the form of mobile devices, computers, autonomous vehicles, business computing equipment, industrial processing equipment)

exchange requests and responses that are specific to the type of endpoint network aggregation. For instance, client endpoints 910 may obtain network access via a wired broadband network, by exchanging requests and responses 922 through an on-premise network system 932. Some client endpoints 910, such as mobile computing devices, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 710 to aggregate traffic and requests. Thus, within the edge cloud 710, the TSP may deploy various compute and storage resources, such as at edge aggregation nodes 940, to provide requested content. The edge aggregation nodes 940 and other systems of the edge cloud 710 are connected to a cloud or data center 960, which uses a backhaul network 950 to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 710 or other areas of the TSP infrastructure.

Figure 10:
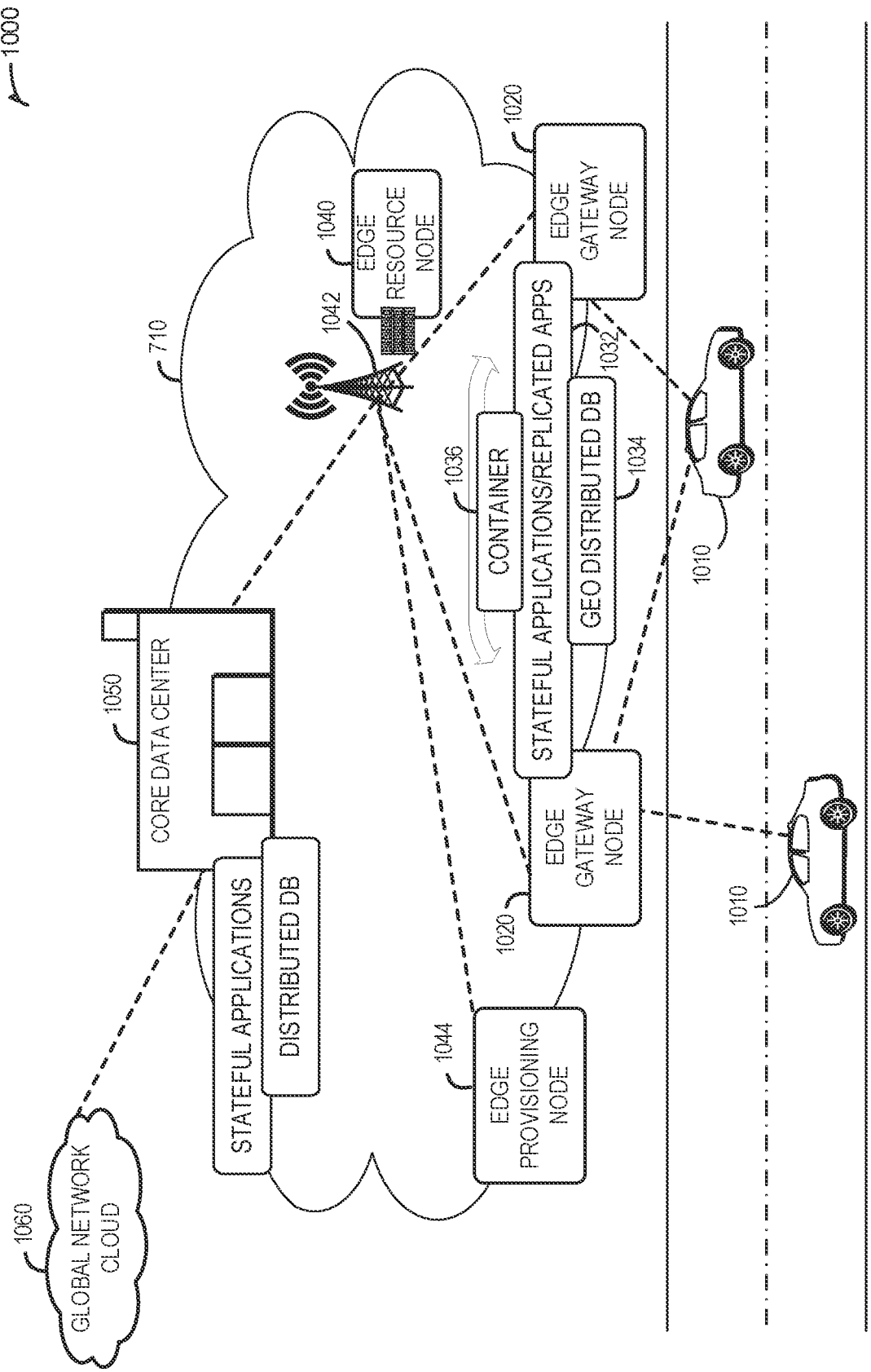
FIG. 10 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 10 shows a simplified vehicle compute and communication use case involving mobile access to applications in an edge computing system 1000 that implements an edge cloud 710. In this use case, respective client compute nodes 1010 may be embodied as in-vehicle compute systems (e.g., in-vehicle navigation and/or infotainment systems) located in corresponding vehicles which communicate with the edge gateway nodes 1020 during traversal of a roadway. For instance, the edge gateway nodes 1020 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1010 and a particular edge gateway device 1020 may propagate so as to maintain a consistent connection and context for the client compute node 1010. Likewise, mobile edge nodes may aggregate at the high priority services or according to the throughput or latency resolution requirements for the underlying service(s) (e.g., in the case of drones). The respective edge gateway devices 1020 include an amount of processing and storage capabilities and, as such, some processing and/or storage of data for the client compute nodes 1010 may be performed on one or more of the edge gateway devices 1020.

The edge gateway devices 1020 may communicate with one or more edge resource nodes 1040, which are illustratively embodied as compute servers, appliances or components located at or in a communication base station 1042 (e.g., a base station of a cellular network). As discussed above, the respective edge resource nodes 1040 include an amount of processing and storage capabilities and, as such, some processing and/or storage of data for the client compute nodes 1010 may be performed on the edge resource node 1040. For example, the processing of data that is less urgent or important may be performed by the edge resource node 1040, while the processing of data that is of a higher urgency or importance may be performed by the edge gateway devices 1020 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1040 also communicate with the core data center 1050, which may include compute servers, appliances, and/or other components located in a central location (e.g., a central office of a cellular communication network). The core data center 1050 may provide a gateway to the global network cloud 1060 (e.g., the Internet) for the edge cloud 710 operations formed by the edge resource node(s) 1040 and the edge gateway devices 1020. Additionally, in some examples, the core data center 1050 may include an amount of processing and storage capabilities and, as such, some processing and/or storage of data for the client compute devices may be performed on the core data center 1050 (e.g., processing of low urgency or importance, or high complexity).

The edge gateway nodes 1020 or the edge resource nodes 1040 may offer the use of stateful applications 1032 and a geographic distributed database 1034. Although the applications 1032 and database 1034 are illustrated as being horizontally distributed at a layer of the edge cloud 710, it will be understood that resources, services, or other components of the application may be vertically distributed throughout the edge cloud (including, part of the application executed at the client compute node 1010, other parts at the edge gateway nodes 1020 or the edge resource nodes 1040, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1036 (or pod of containers) may be flexibly migrated from an edge node 1020 to other edge nodes (e.g., 1020, 640, etc.) such that the container with an application and workload does not need to be reconstituted, re-compiled, re-interpreted in order for migration to work. However, in such settings, there may be some remedial or "swizzling" translation operations applied. For example, the physical hardware at node 1040 may differ from edge gateway node 1020 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 10 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1020, some others at the edge resource node 1040, and others in the core data center 1050 or global network cloud 1060.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1000 can include or be in communication with an edge provisioning node 1044. The edge provisioning node 1044 can distribute software such as the example computer readable instructions 282 of FIG. 2B, to various receiving parties for implementing any of the methods described herein. The example edge provisioning node 1044 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1044. For example, the entity that owns and/or operates the edge provisioning node 1044 may be a developer, a seller, and/or a licensor (or a customer and/or consumer thereof) of software instructions such as the example computer readable instructions 282 of FIG. 2B. The receiving parties may be consumers, service providers, users, retailers, OEMs, etc., who purchase and/or license the software instructions for use and/or re-sale and/or sub-licensing.

In an example, edge provisioning node 1044 includes one or more servers and one or more storage devices. The storage devices host computer readable instructions such as the example computer readable instructions 282 of FIG. 2B, as described below. Similarly to edge gateway devices 1020 described above, the one or more servers of the edge provisioning node 1044 are in communication with a base station 1042 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 282 from the edge provisioning node 1044. For example, the software instructions, which may correspond to the example computer readable instructions 282 of FIG. 2B, may be downloaded to the example processor platform/s, which is to execute the computer readable instructions 282 to implement the methods described herein.

In some examples, the processor platform(s) that execute the computer readable instructions 282 can be physically located in different geographic locations, legal jurisdictions, etc. In some examples, one or more servers of the edge provisioning node 1044 periodically offer, transmit, and/or force updates to the software instructions (e.g., the example computer readable instructions 282 of FIG. 2B) to ensure improvements, patches, updates, etc. are distributed and applied to the software instructions implemented at the end user devices. In some examples, different components of the computer readable instructions 282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 11:
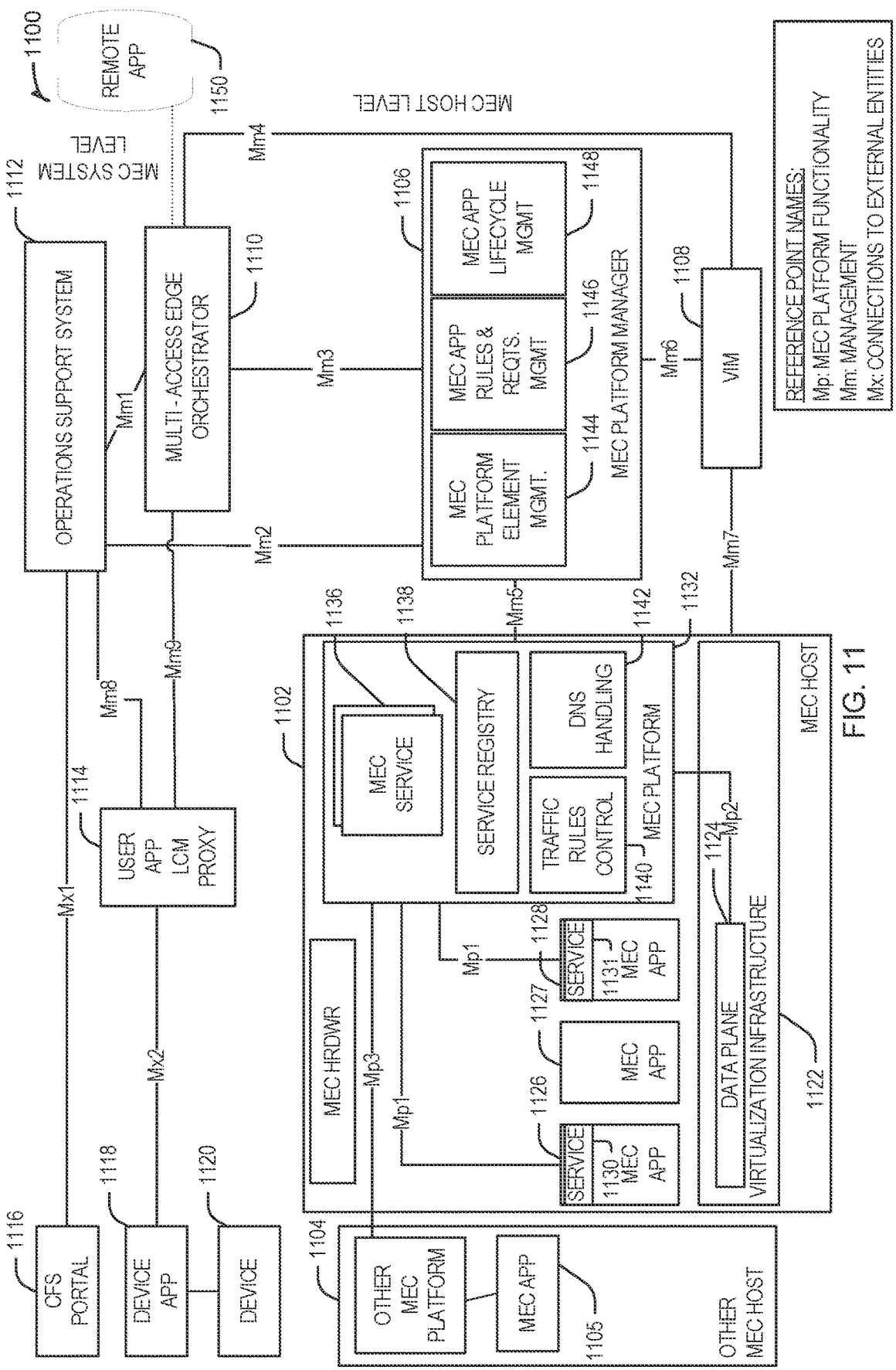
FIG. 11 illustrates an example mobile edge system reference architecture, arranged according to an ETSI Multi-Access Edge Computing (MEC) specification.

FIG. 11 illustrates a mobile edge system reference architecture (or MEC architecture) 1100, such as is indicated by ETSI MEC specifications. FIG. 11 specifically illustrates a MEC architecture 1100 with MEC hosts 1102 and 1104 providing functionalities in accordance with the ETSI GS MEC-003 specification. In some aspects, enhancements to the MEC platform 1132 and the MEC platform manager 1106 may be used for using weighted average noise parameters in video encoding and decoding, as described in more detail above.

Referring to FIG. 11, the MEC network architecture 1100 can include MEC hosts 1102 and 1104, a virtualization infrastructure manager (VIM) 1108, an MEC platform manager 1106, an MEC orchestrator 1110, an operations support system 1112, a user app proxy 1114, a UE app 1118 running on UE 1120, and CFS portal 1116. The MEC host 1102 can include a MEC platform 1132 with filtering rules control component 1140, a DNS handling component 1142, a service registry 1138, and MEC services 1136. The MEC services 1136 can include at least one scheduler, which can be used to select resources for instantiating MEC apps (or NFVs) 1126, 1127, and 1128 upon virtualization infrastructure 1122. The MEC apps 1126 and 1128 can be configured to provide services 1130 and 1131, which can include processing network communications traffic of different types associated with one or more wireless connections (e.g., connections to one or more RAN or telecom-core network entities). The MEC app 1105 instantiated within MEC host 1104 can be similar to the MEC apps 1126-7728 instantiated within MEC host 1102. The virtualization infrastructure 1122 includes a data plane 1124 coupled to the MEC platform via an MP2 interface. Additional interfaces between various network entities of the MEC architecture 1100 are illustrated in FIG. 11.

The MEC platform manager 1106 can include MEC platform element management component 1144, MEC app rules and requirements management component 1146, and MEC app lifecycle management component 1148. The various entities within the MEC architecture 1100 can perform functionalities as disclosed by the ETSI GS MEC-003 specification.

In some aspects, the remote application (or app) 1150 is configured to communicate with the MEC host 1102 (e.g., with the MEC apps 1126-7728) via the MEC orchestrator 1110 and the MEC platform manager 1106.

Figure 12:
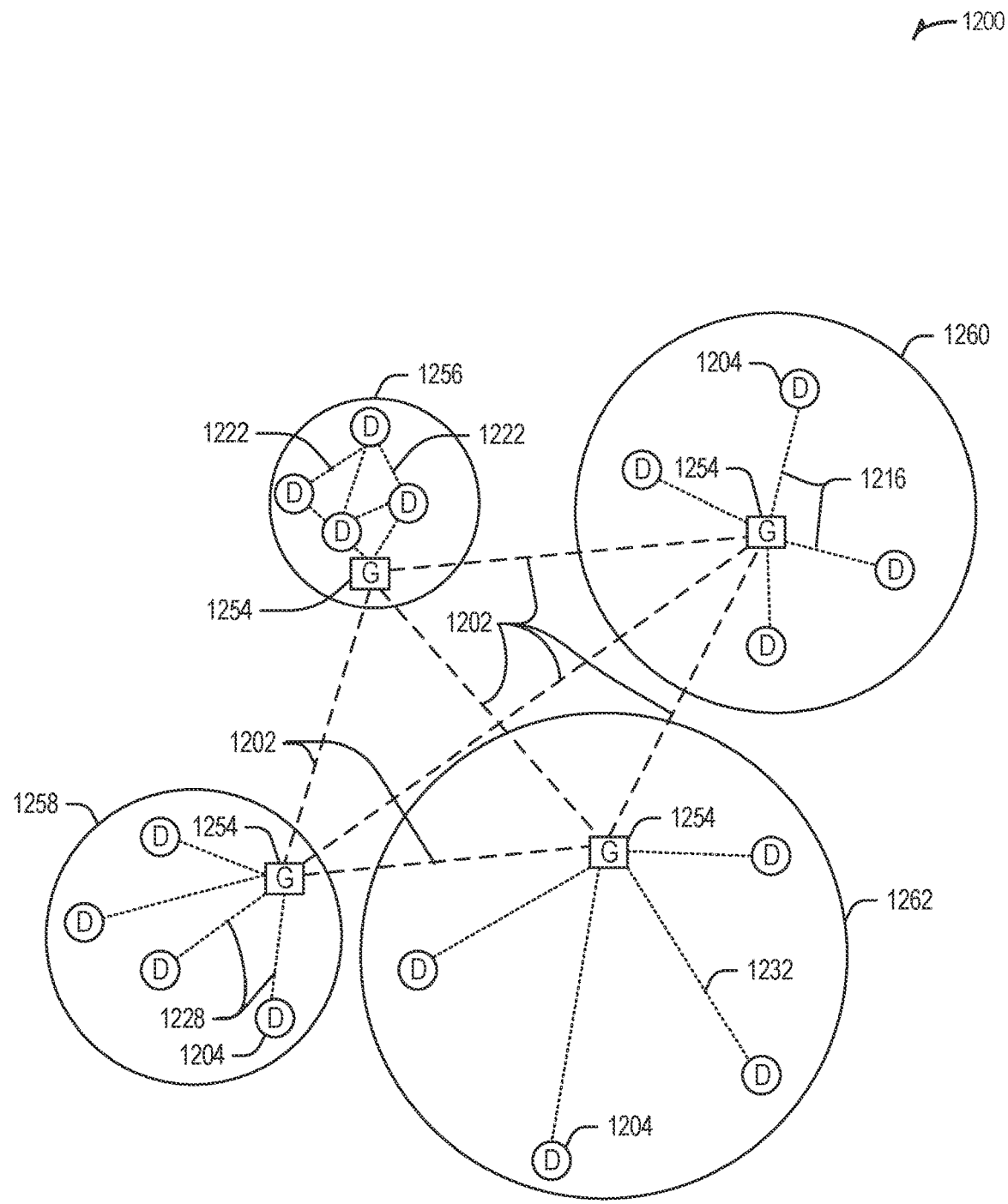
FIG. 12 illustrates a domain topology for respective internet-of-things (IoT) networks coupled through links to respective gateways, according to an example.

FIG. 12 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 13:
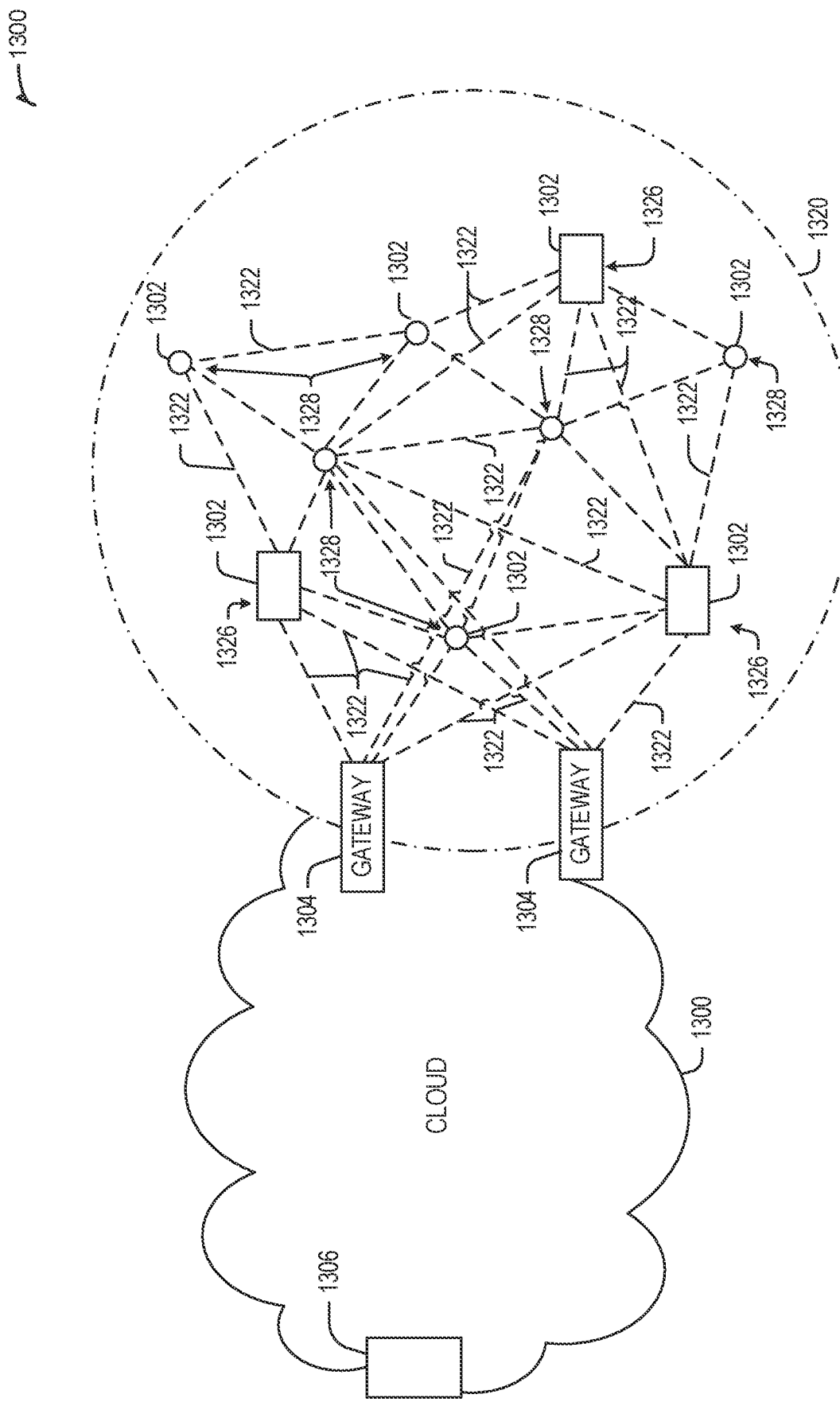
FIG. 13 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 12 and 13, present a number of new challenges in a heterogeneous network of connectivity comprising a combination of wired and wireless technologies.

FIG. 12 specifically provides a simplified drawing of a domain topology that may be used for a number of internet-of-things (IoT) networks comprising IoT devices 1204, with the IoT networks 1256, 1258, 1260, 1262, coupled through backbone links 1202 to respective gateways 1254. For example, a number of IoT devices 1204 may communicate with a gateway 1254, and with each other through the gateway 1254. To simplify the drawing, not every IoT device 1204, or communications link (e.g., link 1216, 1222, 1228, or 1232) is labeled. The backbone links 1202 may include any number of wired or wireless technologies, including optical networks, and may be part of a local area network (LAN), a wide area network (WAN), or the Internet. Additionally, such communication links facilitate optical signal paths among both IoT devices 1204 and gateways 1254, including the use of MUXing/deMUXing components that facilitate interconnection of the various devices.

The network topology may include any number of types of IoT networks, such as a mesh network provided with the network 1256 using Bluetooth low energy (BLE) links 1222. Other types of IoT networks that may be present include a wireless local area network (WLAN) network 1258 used to communicate with IoT devices 1204 through IEEE 802.11 (Wi-Fi®) links 1228, a cellular network 1260 used to communicate with IoT devices 1204 through an LTE/LTE-A (4G) or 5G cellular network, and a low-power wide area (LPWA) network 1262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1204, such as over the backbone links 1202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1258, for instance, may use systems that perform standards conversion to provide multi-standard connectivity, enabling IoT devices 1204 using different protocols to communicate. Further systems may provide seamless interconnectivity across a multi-standard infrastructure comprising visible Internet resources and hidden Internet resources.

Communications in the cellular network 1260, for instance, may be enhanced by systems that offload data, extend communications to more remote devices, or both. The LPWA network 1262 may include systems that perform non-Internet protocol (IP) to IP interconnections, addressing, and routing. Further, each of the IoT devices 1204 may include the appropriate transceiver for wide area communications with that device. Further, each IoT device 1204 may include other transceivers for communications using additional protocols and frequencies. This is discussed further with respect to the communication environment and hardware of an IoT processing device depicted in FIGS. 14 and 15.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 13 below.

FIG. 13 illustrates a cloud computing network in communication with a mesh network of IoT devices (devices 1302) operating as a fog platform in a networked scenario. The mesh network of IoT devices may be termed a fog network 1320, established from a network of devices operating at the edge of the cloud 1300. To simplify the diagram, not every IoT device 1302 is labeled.

The fog network 1320 may be considered to be a massively interconnected network wherein a number of IoT devices 1302 are in communications with each other, for example, by radio links 1322. The fog network 1320 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1320 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1302 are shown in this example, gateways 1304, data aggregators 1326, and sensors 1328, although any combinations of IoT devices 1302 and functionality may be used. The gateways 1304 may be edge devices that provide communications between the cloud 1300 and the fog network 1320, and may also provide the backend process function for data obtained from sensors 1328, such as motion data, flow data, temperature data, and the like. The data aggregators 1326 may collect data from any number of the sensors 1328, and perform the back end processing function for the analysis. The results, raw data, or both may be passed along to the cloud 1300 through the gateways 1304. The sensors 1328 may be full IoT devices 1302, for example, capable of both collecting data and processing the data. In some cases, the sensors 1328 may be more limited in functionality, for example, collecting the data and allowing the data aggregators 1326 or gateways 1304 to process the data.

Communications from any IoT device 1302 may be passed along a convenient path between any of the IoT devices 1302 to reach the gateways 1304. In these networks, the number of interconnections provide substantial redundancy, allowing communications to be maintained, even with the loss of a number of IoT devices 1302. Further, the use of a mesh network may allow IoT devices 1302 that are very low power or located at a distance from infrastructure to be used, as the range to connect to another IoT device 1302 may be much less than the range to connect to the gateways 1304.

The fog network 1320 provided from these IoT devices 1302 may be presented to devices in the cloud 1300, such as a server 1306, as a single device located at the edge of the cloud 1300, e.g., a fog network operating as a device or platform. In this example, the alerts coming from the fog platform may be sent without being identified as coming from a specific IoT device 1302 within the fog network 1320. In this fashion, the fog network 1320 may be considered a distributed platform that provides computing and storage resources to perform processing or data-intensive tasks such as data analytics, data aggregation, and machine-learning, among others.

In some examples, the IoT devices 1302 may be configured using an imperative programming style, e.g., with each IoT device 1302 having a specific function and communication partners. However, the IoT devices 1302 forming the fog platform may be configured in a declarative programming style, enabling the IoT devices 1302 to reconfigure their operations and communications, such as to determine needed resources in response to conditions, queries, and device failures. As an example, a query from a user located at a server 1306 about the operations of a subset of equipment monitored by the IoT devices 1302 may result in the fog network 1320 device the IoT devices 1302, such as particular sensors 1328, needed to answer the query. The data from these sensors 1328 may then be aggregated and analyzed by any combination of the sensors 1328, data aggregators 1326, or gateways 1304, before being sent on by the fog network 1320 to the server 1306 to answer the query. In this example, IoT devices 1302 in the fog network 1320 may select the sensors 1328 used based on the query, such as adding data from flow sensors or temperature sensors. Further, if some of the IoT devices 1302 are not operational, other IoT devices 1302 in the fog network 1320 may provide analogous data, if available.

In other examples, the operations and functionality described herein may be embodied by an IoT or edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 14:
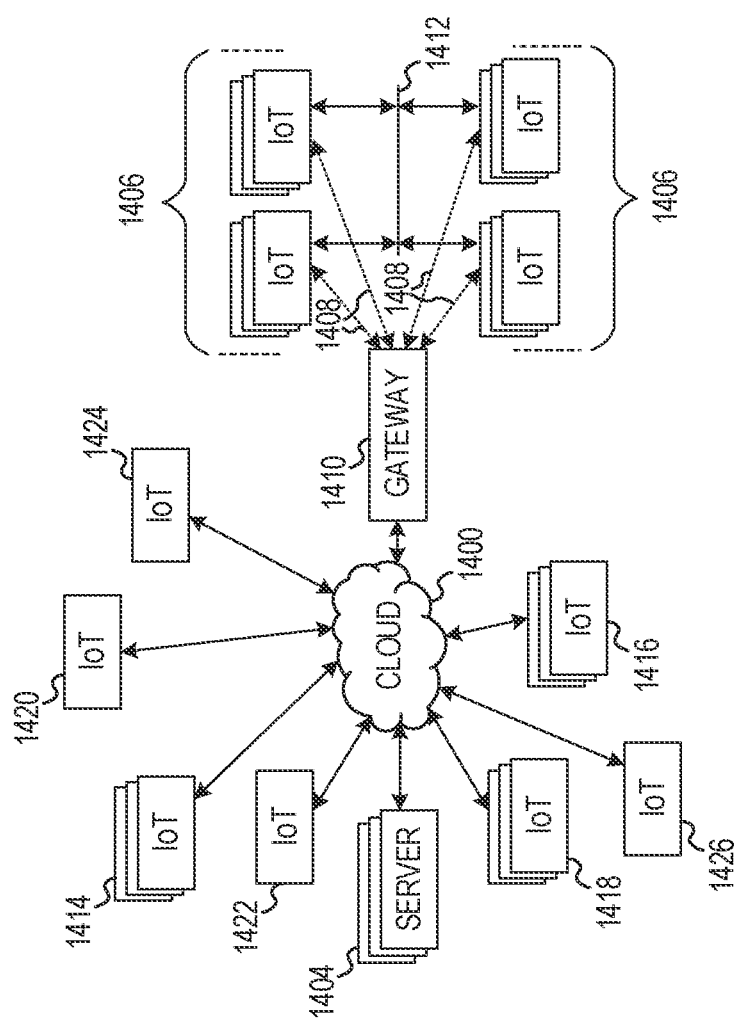
FIG. 14 illustrates a drawing of a cloud computing network, or cloud, in communication with a number of Internet of Things (IoT) devices, according to an example.

FIG. 14 illustrates a drawing of a cloud computing network, or cloud 1400, in communication with a number of Internet of Things (IoT) devices. The cloud 1400 may represent the Internet, or may be a local area network (LAN), or a wide area network (WAN), such as a proprietary network for a company. The IoT devices may include any number of different types of devices, grouped in various combinations. For example, a traffic control group 1406 may include IoT devices along streets in a city. These IoT devices may include stoplights, traffic flow monitors, cameras, weather sensors, and the like. The traffic control group 1406, or other subgroups, may be in communication with the cloud 1400 through wired or wireless links 1408, such as LPWA links, and the like. Further, a wired or wireless sub-network 1412 may allow the IoT devices to communicate with each other, such as through a local area network, a wireless local area network, and the like. The IoT devices may use another device, such as a gateway 1410 or 1428 to communicate with remote locations such as the cloud 1400; the IoT devices may also use one or more servers 1430 to facilitate communication with the cloud 1400 or with the gateway 1410. For example, the one or more servers 1430 may operate as an intermediate network node to support a local edge cloud or fog implementation among a local area network. Further, the gateway 1428 that is depicted may operate in a cloud-to-gateway-to-many edge devices configuration, such as with the various IoT devices 1414, 1420, 1424 being constrained or dynamic to an assignment and use of resources in the cloud 1400.

Other example groups of IoT devices may include remote weather stations 1414, local information terminals 1416, alarm systems 1418, automated teller machines 1420, alarm panels 1422, or moving vehicles, such as emergency vehicles 1424 or other vehicles 1426, among many others. Each of these IoT devices may be in communication with other IoT devices, with servers 1404, with another IoT fog device or system (not shown, but depicted in FIG. 13), or a combination therein. The groups of IoT devices may be deployed in various residential, commercial, and industrial settings (including in both private or public environments).

As may be seen from FIG. 14, a large number of IoT devices may be communicating through the cloud 1400. This may allow different IoT devices to request or provide information to other devices autonomously. For example, a group of IoT devices (e.g., the traffic control group 1406) may request a current weather forecast from a group of remote weather stations 1414, which may provide the forecast without human intervention. Further, an emergency vehicle 1424 may be alerted by an automated teller machine 1420 that a burglary is in progress. As the emergency vehicle 1424 proceeds towards the automated teller machine 1420, it may access the traffic control group 1406 to request clearance to the location, for example, by lights turning red to block cross traffic at an intersection in sufficient time for the emergency vehicle 1424 to have unimpeded access to the intersection.

Clusters of IoT devices, such as the remote weather stations 1414 or the traffic control group 1406, may be equipped to communicate with other IoT devices as well as with the cloud 1400. This may allow the IoT devices to form an ad-hoc network between the devices, allowing them to function as a single device, which may be termed a fog device or system (e.g., as described above with reference to FIG. 13).

Figure 15:
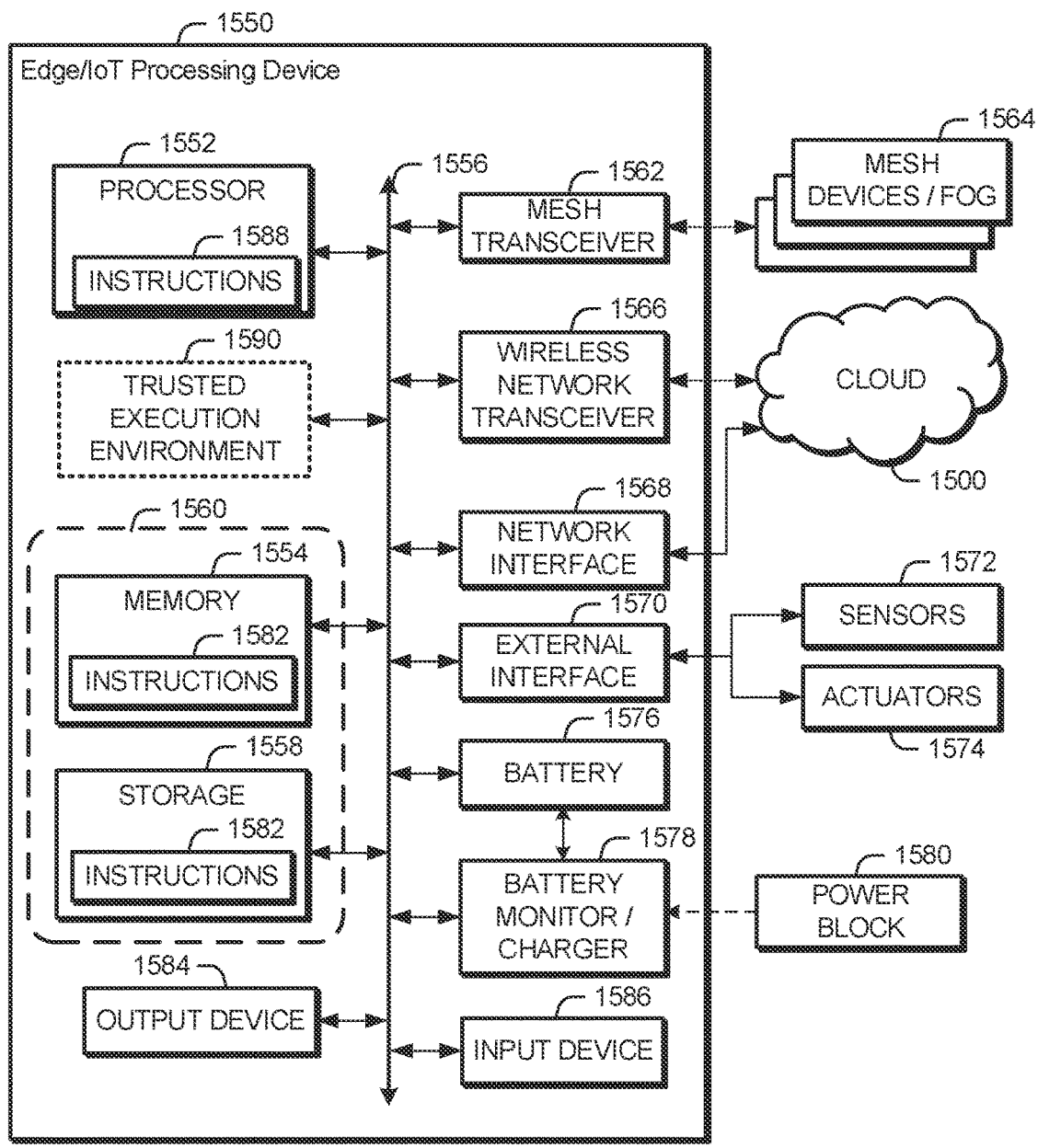
FIG. 15 illustrates a block diagram for an example IoT processing system architecture upon which any one or more of the techniques (e.g., operations, processes, methods, and methodologies) discussed herein may be performed, according to an example.

FIG. 15 is a block diagram of an example of components that may be present in an IoT device 1550 for implementing the techniques described herein. The IoT device 1550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1550, or as components otherwise incorporated within a chassis of a larger system. Additionally, the block diagram of FIG. 15 is intended to depict a high-level view of components of the IoT device 1550. However, some of the components shown may be omitted, additional components may be present, and different arrangement of the components shown may occur in other implementations.

The IoT device 1550 may include processing circuitry in the form of a processor 1552, which may be a microprocessor, a multi-core processor, a multithreaded processor, an ultra-low voltage processor, an embedded processor, or other known processing elements. The processor 1552 may be a part of a system on a chip (SoC) in which the processor 1552 and other components are formed into a single integrated circuit, or a single package, such as the Edison™ or Galileo™ SoC boards from Intel. As an example, the processor 1552 may include an Intel® Architecture Core™ based processor, such as a Quark™, an Atom™, an i3, an i5, an i7, or an MCU-class processor, or another such processor available from Intel® Corporation, Santa Clara, CA However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example the storage 1558 may be implemented via a solid state disk drive (SSDD). Other devices that may be used for the storage 1558 include flash memory cards, such as SD cards, microSD cards, xD picture cards, and the like, and USB flash drives. In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 1562, 1566, 1568, or 1570. Accordingly, in various examples, applicable means for communicating (e.g., receiving, transmitting, etc.) may be embodied by such communications circuitry.

The interconnect 1556 may couple the processor 1552 to a mesh transceiver 1562, for communications with other mesh devices 1564. The mesh transceiver 1562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1562 may communicate using multiple standards or radios for communications at different range. For example, the IoT device 1550 may communicate with close devices, e.g., within about 10 meters, using a local transceiver based on BLE, or another low power radio, to save power. More distant mesh devices 1564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1566 may be included to communicate with devices or services in the cloud 1500 via local or wide area network protocols. The wireless network transceiver 1566 may be a LPWA transceiver that follows the IEEE 802.15.4, or IEEE 802.15.4g standards, among others. The IoT device 1550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1562 and wireless network transceiver 1566, as described herein. For example, the radio transceivers 1562 and 1566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1562 and 1566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1568 may be included to provide a wired communication to the cloud 1500 or to other devices, such as the mesh devices 1564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to allow connect to a second network, for example, a NIC 1568 providing communications to the cloud over Ethernet, and a second NIC 1568 providing communications to other devices over another type of network.

The interconnect 1556 may couple the processor 1552 to an external interface 1570 that is used to connect external devices or subsystems. The external devices may include sensors 1572, such as accelerometers, level sensors, flow sensors, optical light sensors, camera sensors, temperature sensors, a global positioning system (GPS) sensors, pressure sensors, barometric pressure sensors, and the like. The external interface 1570 further may be used to connect the IoT device 1550 to actuators 1574, such as power switches, valve actuators, an audible sound generator, a visual warning device, and the like.

In some optional examples, various input/output (I/O) devices may be present within, or connected to, the IoT device 1550. For example, a display or other output device 1584 may be included to show information, such as sensor readings or actuator position. An input device 1586, such as a touch screen or keypad may be included to accept input. An output device 1586 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1550.

A battery 1576 may power the IoT device 1550, although in examples in which the IoT device 1550 is mounted in a fixed location, it may have a power supply coupled to an electrical grid. The battery 1576 may be a lithium ion battery, or a metal-air battery, such as a zinc-air battery, an aluminum-air battery, a lithium-air battery, and the like.

A battery monitor/charger 1578 may be included in the IoT device 1550 to track the state of charge (SoCh) of the battery 1576. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1578 may communicate the information on the battery 1576 to the processor 1552 over the interconnect 1556. The battery monitor/charger 1578 may also include an analog-to-digital (ADC) convertor that allows the processor 1552 to directly monitor the voltage of the battery 1576 or the current flow from the battery 1576. The battery parameters may be used to determine actions that the IoT device 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the IoT device 1550. A wireless battery charging circuit, such as an LTC4020 chip from Linear Technologies of Milpitas, CA, among others, may be included in the battery monitor/charger 1578. The specific charging circuits chosen depend on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine readable medium 1560 including code to direct the processor 1552 to perform electronic operations in the IoT device 1550. The processor 1552 may access the non-transitory, machine readable medium 1560 over the interconnect 1556. For instance, the non-transitory, machine readable medium 1560 may be embodied by devices described for the storage 1558 of FIG. 15 or may include specific storage units such as optical disks, flash drives, or any number of other hardware devices. The non-transitory, machine readable medium 1560 may include instructions to direct the processor 1552 to perform a specific sequence or flow of actions, for example, as described with respect to the flowchart(s) and block diagram (s) of operations and functionality depicted above.

Also in a specific example, the instructions 1588 on the processor 1552 (separately, or in combination with the instructions 1588 of the machine readable medium 1560) may configure execution or operation of a trusted execution environment (TEE) 1590. In an example, the TEE 1590 operates as a protected area accessible to the processor 1552 for secure execution of instructions and secure access to data. Various implementations of the TEE 1590, and an accompanying secure area in the processor 1552 or the memory 1554 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 1550 through the TEE 1590 and the processor 1552.

Figure 16:
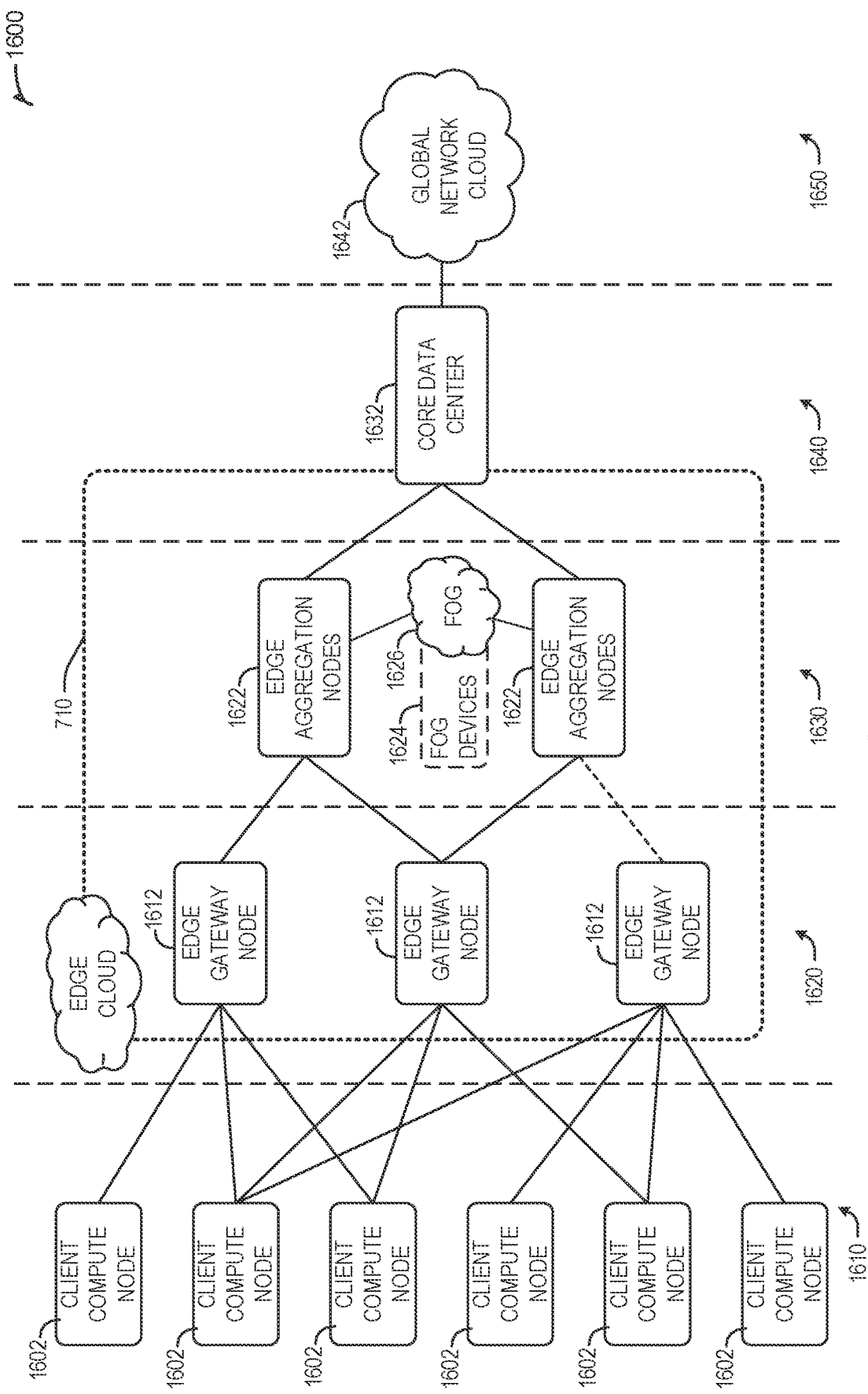
FIG. 16 illustrates an overview of layers of distributed compute deployed among an edge computing system, according to an example.

At a more generic level, an edge computing system may be described to encompass any number of deployments operating in an edge cloud 710, which provide coordination from client and distributed computing devices. FIG. 16 provides a further abstracted overview of layers of distributed compute deployed among an edge computing environment for purposes of illustration.

FIG. 16 generically depicts an edge computing system for providing edge services and applications to multi-stakeholder entities, as distributed among one or more client compute nodes 1602, one or more edge gateway nodes 1612, one or more edge aggregation nodes 1622, one or more core data centers 1632, and a global network cloud 1642, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 1610, 1620, 1630, 1640, 1650. For example, the client compute nodes 1602 are each located at an endpoint layer 1610, while each of the edge gateway nodes 1612 are located at an edge devices layer 1620 (local level) of the edge computing system. Additionally, each of the edge aggregation nodes 1622 (and/or fog devices 1624, if arranged or operated with or among a fog networking configuration 1626) are located at a network access layer 1630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1632 is located at a core network layer 1640 (e.g., a regional or geographically-central level), while the global network cloud 1642 is located at a cloud data center layer 1650 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1632 may be located within, at, or near the edge cloud 710.

Although an illustrative number of client compute nodes 1602, edge gateway nodes 1612, edge aggregation nodes 1622, core data centers 1632, global network clouds 1642 are shown in FIG. 16, it should be appreciated that the edge computing system may include more or fewer devices or systems at each layer. Additionally, as shown in FIG. 16, the number of components of each layer 1610, 1620, 1630, 1640, 1650 generally increases at each lower level (i.e., when moving closer to endpoints). As such, one edge gateway node 1612 may service multiple client compute nodes 1602, and one edge aggregation node 1622 may service multiple edge gateway nodes 1612.

Consistent with the examples provided herein, each client compute node 1602 may be embodied as any type of end point component, device, appliance, or "thing" capable of communicating as a producer or consumer of data. Further, the label "node" or "device" as used in the edge computing system 1600 does not necessarily mean that such node or device operates in a client or agent/minion/follower role; rather, any of the nodes or devices in the edge computing system 1600 refer to individual entities, nodes, or subsystems which include discrete or connected hardware or software configurations to facilitate or use the edge cloud 710.

As such, the edge cloud 710 is formed from network components and functional features operated by and within the edge gateway nodes 1612 and the edge aggregation nodes 1622 of layers 1620, 1630, respectively. The edge cloud 710 may be embodied as any type of network that provides edge computing and/or storage resources which are proximately located to radio access network (RAN) capable endpoint devices (e.g., mobile computing devices, IoT devices, smart devices, etc.), which are shown in FIG. 16 as the client compute nodes 1602. In other words, the edge cloud 710 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 710 may form a portion of or otherwise provide an ingress point into or across a fog networking configuration 1626 (e.g., a network of fog devices 1624, not shown in detail), which may be embodied as a system-level horizontal and distributed architecture that distributes resources and services to perform a specific function. For instance, a coordinated and distributed network of fog devices 1624 may perform computing, storage, control, or networking aspects in the context of an IoT system arrangement. Other networked, aggregated, and distributed functions may exist in the edge cloud 710 between the cloud data center layer 1650 and the client endpoints (e.g., client compute nodes 1602). Some of these are discussed in the following sections in the context of network functions or service virtualization, including the use of virtual edges and virtual services which are orchestrated for multiple stakeholders.

The edge gateway nodes 1612 and the edge aggregation nodes 1622 cooperate to provide various edge services and security to the client compute nodes 1602. Furthermore, because each client compute node 1602 may be stationary or mobile, each edge gateway node 1612 may cooperate with other edge gateway devices to propagate presently provided edge services and security as the corresponding client compute node 1602 moves about a region. To do so, each of the edge gateway nodes 1612 and/or edge aggregation nodes 1622 may support multiple tenancy and multiple stakeholder configurations, in which services from (or hosted for) multiple service providers and multiple consumers may be supported and coordinated across a single or multiple compute devices.

Figure 17:
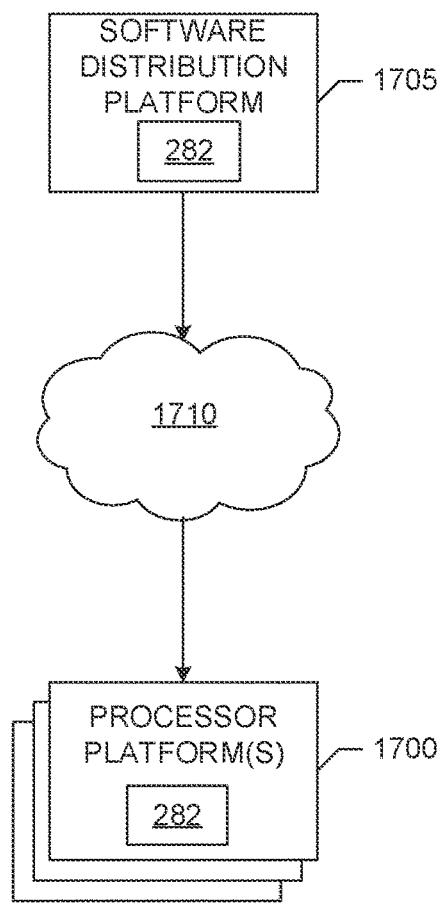
FIG. 17 illustrates an example software distribution platform, according to an example.

FIG. 17 illustrates an example software distribution platform 1705 to distribute software, such as the example computer readable instructions 282 of FIG. 2B, to one or more devices, such as example processor platform(s) 1700 and/or example connected edge devices 262. The example software distribution platform 1705 may be implemented by any computer server, data facility, cloud service, etc., capable of storing and transmitting software to other computing devices (e.g., third parties, the example connected edge devices 262 of FIG. 2B). Example connected edge devices may be customers, clients, managing devices (e.g., servers), third parties (e.g., customers of an entity owning and/or operating the software distribution platform 1705). Example connected edge devices may operate in commercial and/or home automation environments. In some examples, a third party is a developer, a seller, and/or a licensor of software such as the example computer readable instructions 282 of FIG. 2B. The third parties may be consumers, users, retailers, OEMs, etc. that purchase and/or license the software for use and/or re-sale and/or sublicensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 17, the software distribution platform 1705 includes one or more servers and one or more storage devices. The storage devices store the computer readable instructions 282, which may correspond to the example computer readable instructions 282 of FIG. 2B, as described above. The one or more servers of the example software distribution platform 1705 are in communication with a network 1710, which may correspond to any one or more of the Internet and/or any of the example networks 295 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 282 from the software distribution platform 1705. For example, the software, which may correspond to the example computer readable instructions 282 of FIG. 2B, may be downloaded to the example processor platform(s) 1700 (e.g., example connected edge devices), which is/are to execute the computer readable instructions 282 to implement the software. In some examples, one or more servers of the software distribution platform 1705 are communicatively connected to one or more security domains and/or security devices through which requests and transmissions of the example computer readable instructions 282 must pass. In some examples, one or more servers of the software distribution platform 1705 periodically offer, transmit, and/or force updates to the software (e.g., the example computer readable instructions 282 of FIG. 2B) to ensure improvements, patches, updates, etc. are distributed and applied to the software at the end user devices.

In the illustrated example of FIG. 17, the computer readable instructions 282 are stored on storage devices of the software distribution platform 1705 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 282 stored in the software distribution platform 1705 are in a first format when transmitted to the example processor platform(s) 1700. In some examples, the first format is an executable binary in which particular types of the processor platform(s) 1700 can execute. However, in some examples, the first format is uncompiled code that requires one or more preparation tasks to transform the first format to a second format to enable execution on the example processor platform(s) 1700. For instance, the receiving processor platform(s) 1700 may need to compile the computer readable instructions 282 in the first format to generate executable code in a second format that is capable of being executed on the processor platform(s) 1700. In still other examples, the first format is interpreted code that, upon reaching the processor platform (s) 1700, is interpreted by an interpreter to facilitate execution of instructions.

EXAMPLES

Illustrative examples of the technologies disclosed herein are provided below. An embodiment of the technologies may include any one or more, and any combination of, the examples described below.

Example 1 includes a compute node for encoding video, the compute node comprising a video encoder to determine a region of interest (ROI) weighting parameter and a non-ROI weighting parameter; receive a first frame of a video from a video source; determine a region of interest of the first frame; encode the first frame based on the determined region of interest of the first frame to generate an encoded first frame; determine a weighted average noise parameter of the first frame based on the difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter; receive a second frame of a video from a video source, wherein the second frame is after the first frame; determine a region of interest of the second frame; and encode the second frame based on the determined region of interest of the second frame and based on the weighted average noise parameter of the first frame.

Example 2 includes the subject matter of Example 1, and wherein the video encoder is further to determine the noise parameter of the region of interest of the first frame based on a pixel-by-pixel comparison of the region of interest of the encoded first frame and the region of interest of the first frame without encoding; and determine the noise parameter of the region outside the region of interest of the first frame based on a pixel-by-pixel comparison of the region outside the region of interest of the encoded first frame and the region outside the region of interest of the first frame without encoding.

Example 3 includes the subject matter of any of Examples 1 and 2, and wherein to determine the weighted average noise parameter comprises to determine a weighted average peak signal to noise ratio.

Example 4 includes the subject matter of any of Examples 1-3, and wherein to determine the weighted average noise parameter comprises to determine a weighted average structural similarity index measure.

Example 5 includes the subject matter of any of Examples 1-4, and wherein the second frame is the frame immediately after the first frame.

Example 6 includes the subject matter of any of Examples 1-5, and wherein the ROI weighting parameter is at least ten times the non-ROI weighting parameter.

Example 7 includes the subject matter of any of Examples 1-6, and wherein the non-ROI weighting parameter is one.

Example 8 includes a system comprising the compute node of claim 1, further comprising a sink compute node, the sink compute node comprising a video decoder to receive the second frame of the video from the source compute device; determine the region of interest of the second frame of the video with use of a machine-learning-based algorithm; and improve the quality of the determined region of interest of the second frame of the video with use of a second machine-learning-based algorithm.

Example 9 includes a method for encoding video, the method comprising determining, by a compute node, a region of interest (ROI) weighting parameter and a non-ROI weighting parameter; receiving, by the compute node, a first frame of a video from a video source; determining, by the compute node, a region of interest of the first frame; encoding, by the compute node, the first frame based on the determined region of interest of the first frame to generate an encoded first frame; determining, by the compute node, a weighted average noise parameter of the first frame based on the difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter; receiving, by the compute node, a second frame of a video from a video source, wherein the second frame is after the first frame; determining, by the compute node, a region of interest of the second frame; and encoding, by the compute node, the second frame based on the determined region of interest of the second frame and based on the weighted average noise parameter of the first frame.

Example 10 includes the subject matter of Example 9, and further including determining the noise parameter of the region of interest of the first frame based on a pixel-by-pixel comparison of the region of interest of the encoded first frame and the region of interest of the first frame without encoding; and determining the noise parameter of the region outside the region of interest of the first frame based on a pixel-by-pixel comparison of the region outside the region of interest of the encoded first frame and the region outside the region of interest of the first frame without encoding.

Example 11 includes the subject matter of any of Examples 9 and 10, and wherein determining the weighted average noise parameter comprises determining a weighted average peak signal to noise ratio.

Example 12 includes the subject matter of any of Examples 9-11, and wherein determining the weighted average noise parameter comprises determining a weighted average structural similarity index measure.

Example 13 includes the subject matter of any of Examples 9-12, and wherein the second frame is the frame immediately after the first frame.

Example 14 includes the subject matter of any of Examples 9-13, and wherein the ROI weighting parameter is at least ten times the non-ROI weighting parameter.

Example 15 includes the subject matter of any of Examples 9-14, and wherein the non-ROI weighting parameter is one.

Example 16 includes a compute node for encoding video, the compute node comprising means for determining a region of interest (ROI) weighting parameter and a non-ROI weighting parameter; means for receiving a first frame of a video from a video source; means for determining a region of interest of the first frame; means for encoding the first frame based on the determined region of interest of the first frame to generate an encoded first frame; means for determining a weighted average noise parameter of the first frame based on the difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter; means for receiving a second frame of a video from a video source, wherein the second frame is after the first frame; means for determining a region of interest of the second frame; and means for encoding the second frame based on the determined region of interest of the second frame and based on the weighted average noise parameter of the first frame.

Example 17 includes the subject matter of Example 16, and further including means for determining the noise parameter of the region of interest of the first frame based on a pixel-by-pixel comparison of the region of interest of the encoded first frame and the region of interest of the first frame without encoding; and means for determining the noise parameter of the region outside the region of interest of the first frame based on a pixel-by-pixel comparison of the region outside the region of interest of the encoded first frame and the region outside the region of interest of the first frame without encoding.

Example 18 includes the subject matter of any of Examples 16 and 17, and wherein the means for determining the weighted average noise parameter comprises means for determining a weighted average peak signal to noise ratio.

Example 19 includes the subject matter of any of Examples 16-18, and wherein the means for determining the weighted average noise parameter comprises means for determining a weighted average structural similarity index measure.

Example 20 includes the subject matter of any of Examples 16-19, and wherein the second frame is the frame immediately after the first frame.

Example 21 includes the subject matter of any of Examples 16-20, and wherein the ROI weighting parameter is at least ten times the non-ROI weighting parameter.

Example 22 includes the subject matter of any of Examples 16-21, and wherein the non-ROI weighting parameter is one.

Example 23 includes one or more computer-readable media comprising a plurality of instructions stored thereon that, when executed, causes a compute node to determine a region of interest (ROI) weighting parameter and a non-ROI weighting parameter; receive a first frame of a video from a video source; determine a region of interest of the first frame; encode the first frame based on the determined region of interest of the first frame to generate an encoded first frame; determine a weighted average noise parameter of the first frame based on the difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter; receive a second frame of a video from a video source, wherein the second frame is after the first frame; determine a region of interest of the second frame; and encode the second frame based on the determined region of interest of the second frame and based on the weighted average noise parameter of the first frame.

Example 24 includes the subject matter of Example 23, and wherein the plurality of instructions further causes the compute node to determine the noise parameter of the region of interest of the first frame based on a pixel-by-pixel comparison of the region of interest of the encoded first frame and the region of interest of the first frame without encoding; and determine the noise parameter of the region outside the region of interest of the first frame based on a pixel-by-pixel comparison of the region outside the region of interest of the encoded first frame and the region outside the region of interest of the first frame without encoding.

Example 25 includes the subject matter of any of Examples 23 and 24, and wherein to determine the weighted average noise parameter comprises to determine a weighted average peak signal to noise ratio.

Example 26 includes the subject matter of any of Examples 23-25, and wherein to determine the weighted average noise parameter comprises to determine a weighted average structural similarity index measure.

Example 27 includes the subject matter of any of Examples 23-26, and wherein the second frame is the frame immediately after the first frame.

Example 28 includes the subject matter of any of Examples 23-27, and wherein the ROI weighting parameter is at least ten times the non-ROI weighting parameter.

Example 29 includes the subject matter of any of Examples 23-28, and wherein the non-ROI weighting parameter is one.

Example 30 includes a compute node for decoding video, the compute node comprising a video decoder to receive a frame of video; determine a region of interest of the frame of video with use of a machine-learning-based algorithm; and improve the quality of the determined region of interest of the frame of video with use of a second machine-learning-based algorithm.

Example 31 includes the subject matter of Example 30, and wherein to receive the frame of video comprising receiving a weighted average noise parameter associated with the frame, wherein to improve the quality of the determined region of interest comprises to improve the quality of the determined region of interest based on the weighted average noise parameter associated with the frame.

Example 32 includes the subject matter of any of Examples 30 and 31, and further including performing an inference on the frame after improvement of the quality by the second machine-learning-based algorithm.

Example 33 includes a method for decoding video, the method comprising receiving, by a compute node, a frame of video; determining, by the compute node, a region of interest of the frame of video with use of a machine-learning-based algorithm; and improving the quality of the determined region of interest of the frame of video with use of a second machine-learning-based algorithm.

Example 34 includes the subject matter of Example 33, and wherein receiving the frame of video comprising receiving a weighted average noise parameter associated with the frame, wherein improving the quality of the determined region of interest comprises improving the quality of the determined region of interest based on the weighted average noise parameter associated with the frame.

Example 35 includes the subject matter of any of Examples 33 and 34, and further including performing an inference on the frame after improvement of the quality by the second machine-learning-based algorithm.

Example 36 includes a compute node for decoding video, the compute node comprising means for receiving, a frame of video; means for determining a region of interest of the frame of video with use of a machine-learning-based algorithm; and means for improving the quality of the determined region of interest of the frame of video with use of a second machine-learning-based algorithm.

Example 37 includes the subject matter of Example 36, and wherein the means for receiving the frame of video comprising means for receiving a weighted average noise parameter associated with the frame, wherein the means for improving the quality of the determined region of interest comprises means for improving the quality of the determined region of interest based on the weighted average noise parameter associated with the frame.

Example 38 includes the subject matter of any of Examples 36 and 37, and further including means for performing an inference on the frame after improvement of the quality by the second machine-learning-based algorithm.

Example 39 includes one or more computer-readable media comprising a plurality of instructions stored thereon that, when executed, causes a compute node to receive a frame of video; determine a region of interest of the frame of video with use of a machine-learning-based algorithm; and improve the quality of the determined region of interest of the frame of video with use of a second machine-learning-based algorithm.

Example 40 includes the subject matter of Example 39, and wherein to receive the frame of video comprising receiving a weighted average noise parameter associated with the frame, wherein to improve the quality of the determined region of interest comprises to improve the quality of the determined region of interest based on the weighted average noise parameter associated with the frame.

Example 41 includes the subject matter of any of Examples 39 and 40, and further including performing an inference on the frame after improvement of the quality by the second machine-learning-based algorithm.

In some embodiments, at least one of the systems or components set forth in one or more of the preceding figures may be configured to perform one or more operations, techniques, processes, and/or methods as set forth in the preceding examples. For example, compute node 102, edge node 250, edge/IoT processing device 1550, etc., may be embodied as any of Examples 1-8, 16-22, 30-32, or 36-38 or may perform the method of any of Examples 9-15 or 33-35.

The invention claimed is:

1. A system comprising a compute node for encoding video and a sink compute node, the compute node comprising:
   a video encoder to:
      determine a region of interest (ROI) weighting parameter and a non-ROI weighting parameter;
      receive a first frame of a video from a video source;
      determine a region of interest of the first frame;
      encode the first frame based on the determined region of interest of the first frame to generate an encoded first frame;
      determine a weighted average noise parameter of the first frame based on a difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter;
      receive a second frame of a video from a video source, wherein the second frame is after the first frame;
      determine a region of interest of the second frame; and
      encode the second frame based on the determined region of interest of the second frame and based on the weighted average noise parameter of the first frame,
   the sink compute node comprising:
   a video decoder to:
      receive the second frame of the video from the compute node;
      determine the region of interest of the second frame of the video with use of a machine-learning-based algorithm; and
      improve a quality of a region outside of the determined region of interest of the second frame of the video with use of a second machine-learning-based algorithm without affecting the region of interest; and
   a video inferencer to perform an inference on the second frame after improvement of the quality by the second machine-learning-based algorithm.

2. The system of claim 1, wherein the video encoder is further to:
   determine the noise parameter of the region of interest of the first frame based on a pixel-by-pixel comparison of the region of interest of the encoded first frame and the region of interest of the first frame without encoding; and
   determine the noise parameter of the region outside the region of interest of the first frame based on a pixel-by-pixel comparison of the region outside the region of interest of the encoded first frame and the region outside the region of interest of the first frame without encoding.

3. The system of claim 1, wherein to determine the weighted average noise parameter comprises to determine a weighted average peak signal to noise ratio.

4. The system of claim 1, wherein to determine the weighted average noise parameter comprises to determine a weighted average structural similarity index measure.

5. The system of claim 1, wherein the second frame is the frame immediately after the first frame.

6. The system of claim 1, wherein the ROI weighting parameter is at least ten times the non-ROI weighting parameter.

7. The system of claim 6, wherein the non-ROI weighting parameter is one.

8. A method for encoding video, the method comprising:
   determining, by a compute node, a region of interest (ROI) weighting parameter and a non-ROI weighting parameter;
   receiving, by the compute node, a first frame of a video from a video source;
   determining, by the compute node, a region of interest of the first frame;
   encoding, by the compute node, the first frame based on the determined region of interest of the first frame to generate an encoded first frame;
   determining, by the compute node, a weighted average noise parameter of the first frame based on a difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter;
   receiving, by the compute node, a second frame of a video from a video source, wherein the second frame is after the first frame;
   determining, by the compute node, a region of interest of the second frame;
   encoding, by the compute node, the second frame based on the determined region of interest of the second frame and based on the weighted average noise parameter of the first frame;
   sending, by the compute node, the encoded second frame to a sink compute node;
   receiving, by the sink compute node, the encoded second frame of the video from the compute node;
   determining, by the sink compute node, the region of interest of the second frame of the video with use of a machine-learning-based algorithm;
   improving, by the sink compute node, a quality of a region outside of the determined region of interest of the second frame of the video with use of a second machine-learning-based algorithm without affecting the region of interest; and performing, by the sink compute node, an inference on the second frame after improvement of the quality by the second machine-learning-based algorithm.

9. The method of claim 8, further comprising:
determining the noise parameter of the region of interest of the first frame based on a pixel-by-pixel comparison of the region of interest of the encoded first frame and the region of interest of the first frame without encoding; and
determining the noise parameter of the region outside the region of interest of the first frame based on a pixel-by-pixel comparison of the region outside the region of interest of the encoded first frame and the region outside the region of interest of the first frame without encoding.

10. The method of claim 8, wherein determining the weighted average noise parameter comprises determining a weighted average peak signal to noise ratio.

11. The method of claim 8, wherein determining the weighted average noise parameter comprises determining a weighted average structural similarity index measure.

12. The method of claim 8, wherein the second frame is the frame immediately after the first frame.

13. The method of claim 8, wherein the ROI weighting parameter is at least ten times the non-ROI weighting parameter.

14. The method of claim 13, wherein the non-ROI weighting parameter is one.

15. One or more non-transitory computer-readable media comprising a plurality of instructions stored thereon that, when executed, causes a compute node to:
determine a region of interest (ROI) weighting parameter and a non-ROI weighting parameter;
receive a first frame of a video from a video source;
determine a region of interest of the first frame;
encode the first frame based on the determined region of interest of the first frame to generate an encoded first frame;
determine a weighted average noise parameter of the first frame based on a difference between the encoded first frame and the first frame without encoding, wherein the weighted average noise parameter depends on a noise parameter of the region of interest of the first frame weighted by the ROI weighting parameter and a noise parameter of the region outside the region of interest of the first frame weighted by the non-ROI weighting parameter;
receive a second frame of a video from a video source, wherein the second frame is after the first frame;
determine a region of interest of the second frame;
encode the second frame based on the determined region of interest of the second frame and based on the weighted average noise parameter of the first frame; and
send, by the compute node, the encoded second frame to a sink compute node,
wherein the plurality of instructions further cause the sink compute node to:
receive the encoded second frame of the video from the compute node;
determine the region of interest of the second frame of the video with use of a machine-learning-based algorithm; and
improve a quality of a region outside of the determined region of interest of the second frame of the video with use of a second machine-learning-based algorithm without affecting the region of interest; and
perform an inference on the second frame after improvement of the quality by the second machine-learning-based algorithm.

16. The one or more non-transitory computer-readable media of claim 15, wherein the plurality of instructions further causes the compute node to:
determine the noise parameter of the region of interest of the first frame based on a pixel-by-pixel comparison of the region of interest of the encoded first frame and the region of interest of the first frame without encoding; and
determine the noise parameter of the region outside the region of interest of the first frame based on a pixel-by-pixel comparison of the region outside the region of interest of the encoded first frame and the region outside the region of interest of the first frame without encoding.

17. The one or more non-transitory computer-readable media of claim 15, wherein to determine the weighted average noise parameter comprises to determine a weighted average peak signal to noise ratio.

18. The one or more non-transitory computer-readable media of claim 15, wherein to determine the weighted average noise parameter comprises to determine a weighted average structural similarity index measure.

19. The one or more non-transitory computer-readable media of claim 15, wherein the second frame is the frame immediately after the first frame.

20. The one or more non-transitory computer-readable media of claim 15, wherein the ROI weighting parameter is at least ten times the non-ROI weighting parameter.

21. The one or more non-transitory computer-readable media of claim 20, wherein the non-ROI weighting parameter is one.

22. A compute node for decoding video, the compute node comprising:
a video decoder to:
receive a frame of video;
determine a region of interest of the frame of video with use of a machine-learning-based algorithm; and
improve a quality of a region outside of the determined region of interest of the frame of video with use of a second machine-learning-based algorithm without affecting the region of interest; and
a video inferencer to perform an inference on the frame after improvement of the quality by the second machine-learning-based algorithm.

23. The compute node of claim 22, wherein to receive the frame of video comprises to receive a weighted average noise parameter associated with the frame,
wherein to improve the quality of the region outside of the determined region of interest comprises to improve the quality of the region outside of the determined region of interest based on the weighted average noise parameter associated with the frame.

* * * * *